United States Patent
Lin

(10) Patent No.: US 6,829,722 B2
(45) Date of Patent: Dec. 7, 2004

(54) SYSTEM AND METHOD OF PROCESSING MEMORY

(75) Inventor: Shi-Tron Lin, Taipei (TW)

(73) Assignee: Winbond Electronics Corp., Hsinchu (TW)

(*) Notice: Subject to any disclaimer, the term of this patent is extended or adjusted under 35 U.S.C. 154(b) by 621 days.

(21) Appl. No.: 09/821,326

(22) Filed: Mar. 29, 2001

(65) Prior Publication Data

US 2001/0032327 A1 Oct. 18, 2001

(51) Int. Cl.[7] ............................ G06F 11/00; G06F 9/44; G11C 29/00
(52) U.S. Cl. .......................... 714/8; 714/723; 717/124
(58) Field of Search ............................ 714/2, 5, 8, 25, 714/29, 30, 34, 35, 37, 42, 48, 53, 54, 57, 702, 718, 723, 782; 717/124, 127, 128, 131

(56) References Cited

U.S. PATENT DOCUMENTS

| | | | | |
|---|---|---|---|---|
| 3,633,175 A | * | 1/1972 | Harper | ....................... 711/108 |
| 5,200,959 A | * | 4/1993 | Gross et al. | ................ 714/723 |
| 5,781,776 A | * | 7/1998 | Johnston et al. | ............ 717/130 |
| 6,108,797 A | * | 8/2000 | Lin et al. | ........................ 714/8 |
| 6,141,768 A | * | 10/2000 | Lin et al. | ...................... 714/8 |
| 6,178,549 B1 | * | 1/2001 | Lin et al. | .................... 717/124 |
| 6,691,246 B1 | * | 2/2004 | Lin | ............................... 714/8 |

* cited by examiner

Primary Examiner—Albert Decady
Assistant Examiner—Matthew C. Dooley
(74) Attorney, Agent, or Firm—Ladas & Parry

(57) ABSTRACT

A method of processing memory, suitable for loading an executable object code compiled from a source code into the memory that includes defective memory cells. At first, set up a plurality of pre-compiled object codes that correspond to a source code, each pre-compiled object code having at least a skipped-code-address range. Then, test the memory and locate the defective addresses therein. According to the result of the test, the code-loading system selects an executable object that has the matching skipped-code-address range from the pre-compiled object codes, and loads the executable code into the memory. Since the skipped-code-address range covers the defective addresses in the memory, the defective memory cells in the memory won't affect the operation of loading a program.

43 Claims, 21 Drawing Sheets

```
............
............
100  REAL T(10000)
............
............
101  BEGIN
............
............
110  FOR I=1 to 10000 DO
111    INPUT(DEV1,T(I));
............
............
120  FOR I=1 to 10000 DO
121    OUTPUT(DEV2,T(I));
............
............
130  END;
```

Fig. 13A

```
..........
..........
200  CONST IDF=8500;
201     JDF=3000;
..........
..........
210  REAL T(10000)
..........
..........
211  BEGIN
..........
..........
220  I2=IDF;
221  I3=IDF+JDF+1;
..........
..........
230  FOR I=1 to I2 DO
231     BEGIN
232     INPUT(DEV1,T(I));
233     END;
234  FOR I=I3 to 10000+JDF DO
235     BEGIN
236     INPUT(DEV1,T(I));
237     END;
..........
..........
240  FOR I=1 to I2 DO
241     BEGIN
242     OUTPUT(DEV1,T(I));
243     END;
244  FOR I=I3 to 10000+JDF DO
245     BEGIN
246     OUTPUT(DEV1,T(I));
247     END;
..........
..........
250  END;
```

Fig. 13B

```
...........
...........
300  CONST IDF=8500;
301    JDF=3000;
...........
...........
310  REAL T(10000+JDF)
...........
...........
320  BEGIN
...........
...........
330  FOR I=1 to 10000 DO
331    BEGIN
332    IF(I<=IDF)
333      THEN K=1;
334      ELSE K=I+JDF;
335    INPUT(DEV1,T(K));
336    END;
...........
...........
340  FOR I=1 to 10000 DO
341    BEGIN
342    IF(I<=IDF)
343      THEN K=1;
344      ELSE K=I+JDF;
345    OUTPUT(DEV2,T(K));
346    END;
...........
...........
350  END;
```

Fig. 13C

SYSTEM AND METHOD OF PROCESSING MEMORY

FIELD OF THE INVENTION

The present invention relates to a system and method of processing partially defective memories. More particularly, it relates to a system and method of modifying and obtaining (via compiling and linking) corresponding object codes or machine codes for a source code in advance according to all possible defect distribution types of a memory, and then selecting the corresponding object code or machine code to load and execute according to the physical defect distribution type of the memory to be loaded into.

DESCRIPTION OF THE PRIOR ART

In the past, memory ICs (Integrated Circuits) containing any defective memory cell generally would not be sold on the market. To reduce the number of the memory ICs that are thrown away due to one or more defects, there are at present many techniques that can repair defective memory ICs thereby allowing them to work normally.

For example, U.S. Pat. No. 4,939,694 disclosed a memory system that has self-testing and self-repairing functions. The memory system can perform an on-site self-test process to locate defective memory cells. Once these defective memory cells are located, the memory system will use an error correction code engine to correct these defective memory cells. When the error correction code engine becomes overburdened with defective memory cells, the memory system automatically deletes these defective memory cells.

Furthermore, U.S. Pat. No. 5,644,541 disclosed a technique of using substitution memories to correct semiconductor memories with defective memory cells. All access routes to these bad bit-locations are redirected to good memory cells within the substitution memory by using a mapping logic circuit, whereby the defective memory cells are replaced.

A fault-tolerating memory system, disclosed in U.S. Pat. No. 5,278,847, uses an error detecting and correcting code (EDAC). Reliability of storage data can be determined by using the EDAC for each data cell and for adding spare-bits.

In U.S. Pat. No. 5,579,266, a laser-repairing technique and a programmable fuse repairing technique are used to deal with defective memory cells, wherein redundant memories can be used to replace defective memories.

In fact, the error-detecting and repairing technique disclosed in U.S. Pat. No. 4,939,694, the encoding and spare bit technique disclosed in U.S. Pat. No. 5,278,847, and the access-redirecting technique disclosed in U.S. Pat. No. 5,644,541 do not only complicate the hardware design, but also suffer an execution overhead as programs are executed. Further, for the redundancy memory technique disclosed in U.S. Pat. No. 5,579,266, the hardware design and the practical procedure for repairing defective memory cells are also complicated.

On the other hand, an executable machine code or object code is generated from the source code of a computer program by using compilers and linkers. The machine code program can be directly downloaded to memories for execution. FIG. 1 (PRIOR ART) shows a system structure of a general single chip computer or a system-on-a-chip. As shown in FIG. 1, the system comprises a central processing unit (CPU) or microprocessor 1, random access memories (RAMs) 3, read-only memory (ROMs) 5, an I/O interface circuit 7, and external storage devices 9 such as hard-disk drives, floppy disk drives, or CD-ROM drives. The general operation is that the CPU 1 loads an executable machine code or object code from the I/O interface circuit 7 or the external storage devices 9 into the RAMs 3 via data/address bus 10. Generally, an object code is comprised of three segment types, instruction segments, data segments, and stack segments, respectively. The CPU 1 executes the object code from the entry point of one of the instruction segments.

FIG. 2 (PRIOR ART) is a flow chart illustrating the process of executing an object code. First, an entry point is acquired (S100). Then, the address of the next instruction is fetched (S101). According to the address, the opcode of the next instruction can be fetched (S102). Then, the opcode is decoded (S103). Next, determination of whether one or more operands are needed for the current instruction can be determined by the decoded information of the current instruction. Then, the operand can be read from the follow-up address, if any (S104). Finally, the instruction is executed by the operation defined in the fetched opcode and the data/reference addresses defined in the operand (S105). If the current instruction is a termination instruction (S106), the process of executing the machine code program finishes (S107). Otherwise, the process goes back to step S101 to acquire the address of the next instruction. Apparently, it is possible that each instruction does not have the same number of bytes. The instruction length depends on the type of the CPU. Generally, there are two types of instruction sets applied in various CPUs, the variable-length instruction set and the constant length instruction set.

The above-described execution procedure only can be applied to the instruction segments of the object code. If the same execution procedure is applied to other segments, such as the data segments or the stack segments, the decoding result will be erroneous. In this case, when a data byte is decoded into a faulty opcode by the CPU 1, several pieces of sequential data will be mistaken for operands according to the faulty opcode. Generally, the CPU 1 cannot automatically distinguish the instruction segment from the data segment or the stack segment via standard fetching and decoding actions. Furthermore, the instruction segments and the data/stack segments of the program cannot be randomly broken. The instruction pools must be broken based on each complete instruction, including its opcode and the follow-up operands. Generally, the data/stack segments cannot be broken because some of the interrelation within the data/stack segments only can be determined during execution, such as array data structures.

SUMMARY OF THE INVENTION

The object of the present invention is to provide a system and method of processing memory. An appropriate object code, which is loaded into a partially defective memory, can still be executed normally without changing the hardware design or increasing the execution overhead.

Accordingly, the invention provides a method of processing memory, for loading an executable object code compiled from a source code into the memory. At first, set up a plurality of pre-compiled object codes generated from a source code, each pre-compiled object code having at least a skipped-code-address range. Then, test the memory and locate the defective addresses therein by using a tester for example. The tested result (indicated by a defective address or defective distribution type) is directly transferred to a code-loading system, or stored in a label memory of the memory first and then read by the code-loading system.

According to the tested result, the code-loading system selects an executable object code, which has the matching skipped-code-address range, from the pre-compiled object codes; and the selected code is loaded into the memory. Further, via the skipped-code-address table indicating the pre-compiled object code and the corresponding skipped-code-address range, the code-loading system selects and determines an appropriate executable object code by directly checking the skipped-code-address table.

Further, the aforementioned pre-compiled object code can be generated by modifying the source code or object code. For example, in the pattern of modifying a source code, first modify the source code according to the skipped-code-address range, and then compile the modified source code to generate a pre-compiled object code. In the pattern of modifying an object code, compile a source code to generate a standard object code, and then according to the skipped-code-address range modify the standard object code to generate the desired pre-compiled object code.

In the pattern of modifying an object code, if the skipped-code-address range is in the data segments of the object code, generate a plurality of standard object codes with the data segments allocated at different addresses when compiling the aforementioned source code, and modify the standard object codes when the skipped-code-address range is not in the data segments of the standard object code. In another pattern of processing the data segments, when the skipped-code-address range is located in the data segments of the standard object code, modify the source code so as to divide the aforementioned data segments. That is, expand the original data segment to be an expanded data segment so as to cover the skipped-code-address range, and add a judge instruction to each instruction that accesses the data segment so as to determine the physical location in the aforementioned expanded data segment.

Further, if the skipped-code-address ranges of all the pre-compiled objects don't match the detected defective addresses, compile the source code on the spot or modify a dynamic pre-compiled object code to generate an executable object code based on the defective addresses. The dynamic pre-compiled object code includes a plurality of skipped-code-block codes, and the detected defective addresses can be covered by adjusting the location of the skipped-code block.

Further, the present invention also provides a system of processing a memory, for loading the executable object code that is compiled from a source code into the memory, wherein the system comprises: a storage device, for storing a plurality of pre-compiled object codes that correspond to the source code, each pre-compiled object code having at least a skipped-code-address range; a processing unit, for selecting an executable object code, which has the matching skipped-code-address range, from the pre-compiled object codes according to the defective addresses; and an interface circuit, for loading the executable object code into the memory. This structure applies to a specific program that is loaded into a mass memory IC.

Further, the present invention also provides a system of processing a memory, for loading an executable object code that is compiled from a source code, wherein the system comprises: a memory, disposed on an integrated circuit; a storage device, for storing a plurality of pre-compiled object codes that correspond to the source code, the pre-compiled object code having zero or at least one skipped-code-address range; and a processing unit, disposed on the integrated circuit, for testing if the memory includes defective addresses, selecting an executable object code with the matching skipped-code-address range or a default object code with no skipped-code address from the pre-compiled object codes, and loading the selected code into the memory. This structure applies to the memory IC in a microprocessor or a single chip computer.

BRIEF DESCRIPTION OF THE DRAWINGS

The present invention can be more fully understood from the following detailed description and preferred embodiments with reference to the accompanying drawings in which:

FIGS. 13A, 13B, and 13C show source code modifications during data segments breaking in accordance with the first embodiment of the invention;

DETAILED DESCRIPTION OF THE PREFERRED EMBODIMENT OF THE INVENTION

The method and system of processing a partially defective memory in the present invention is designed to prepare in advance a plurality of pre-compiled object codes that correspond to various defect-distribution types, and select an appropriate pre-compiled object code to directly load into a memory IC according to the physical defect-distribution type of the memory IC. The aforementioned defect-distribution types indicate the addresses of defect-distribution in the memory IC, which could be a single memory address, or a sequence of several memory addresses, or several scattered segments of memory addresses. All the aforementioned pre-compiled object codes are generated by compiling and linking a source code, while respectively in the corresponding skipped address ranges dummy codes such as null NOP instructions are filled, a jump instruction such as JMP is used to connect a dummy code inserted broken code, and further reference addresses are modified, so that the same function can be executed. The embodiments of the present invention will be described in detail with reference to the accompanying drawings.

First Embodiment

Figure 1:
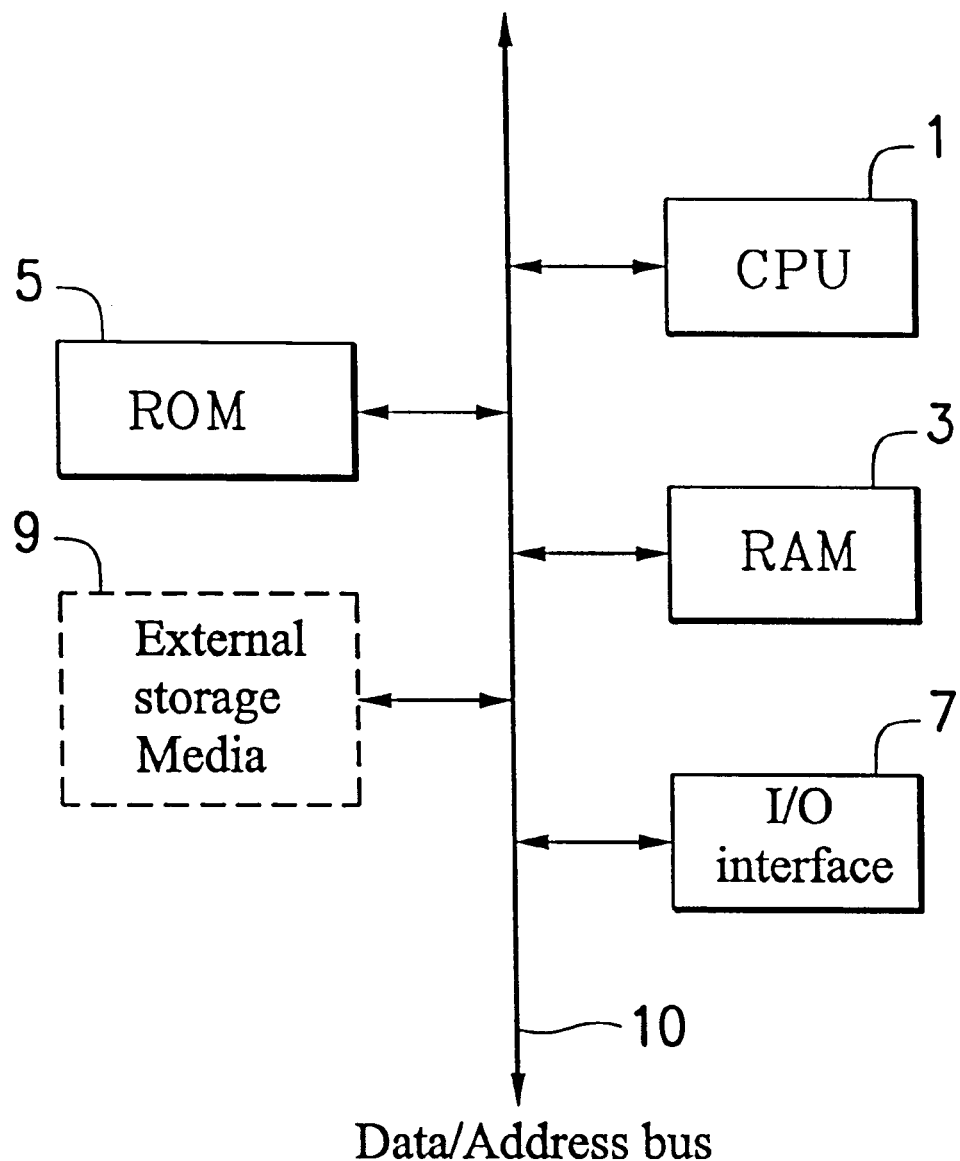
FIG. 1 (PRIOR ART) shows a configuration of a single chip computer or a system-on-a-chip.
Figure 2:
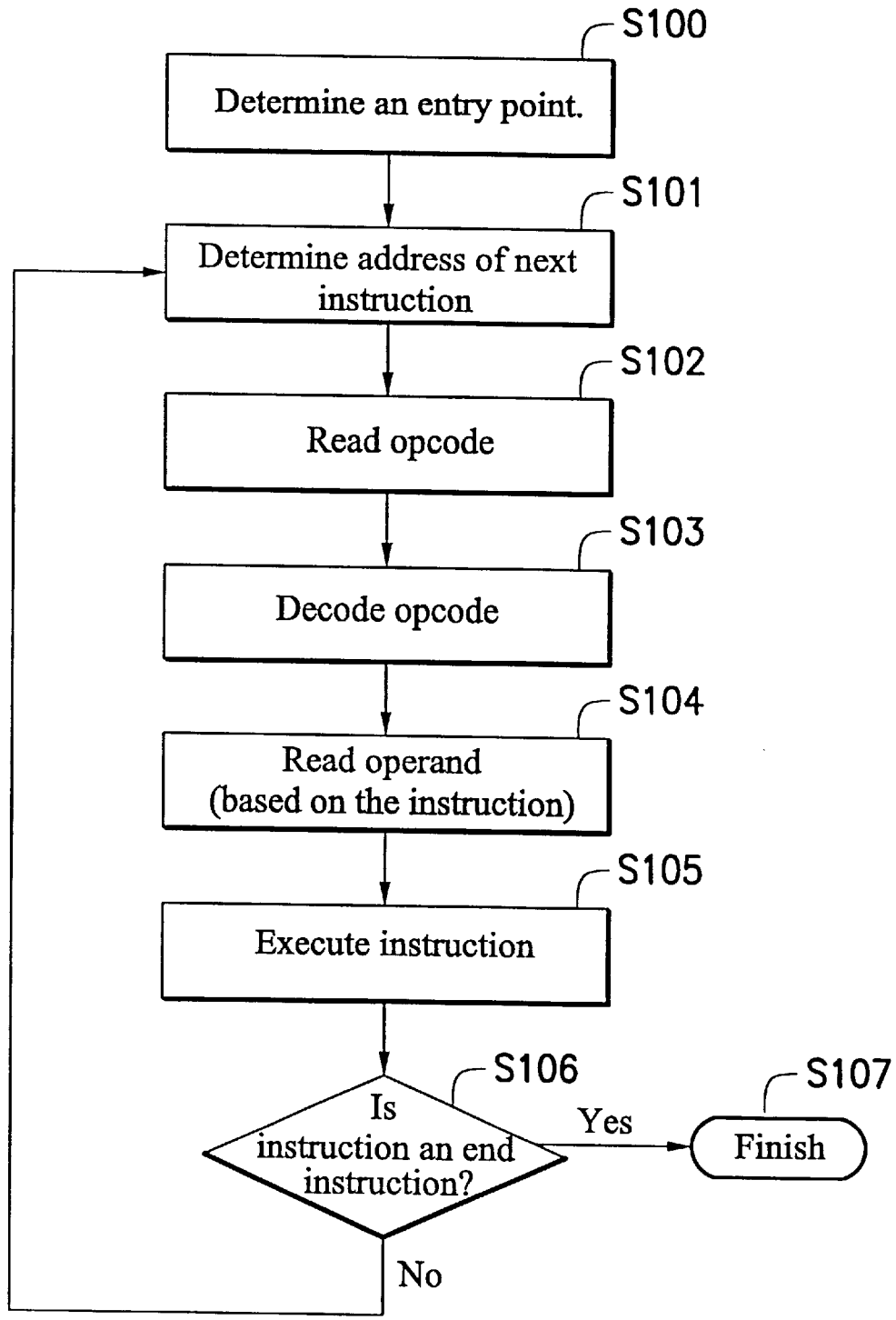
FIG. 2 (PRIOR ART) is a flowchart illustrating the conventional procedure of executing an object code.
Figure 3:
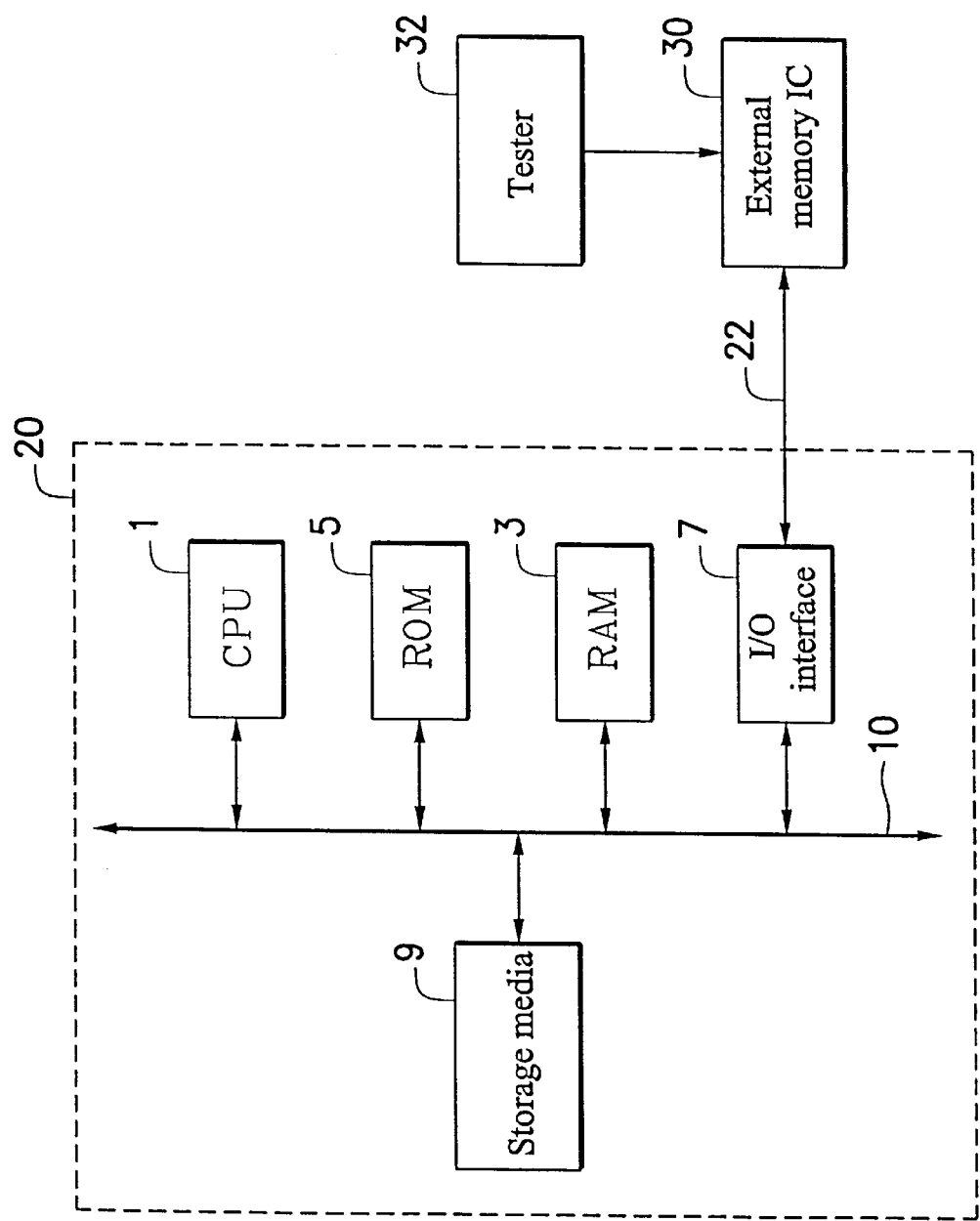
FIG. 3 shows a block diagram of a system for processing a partially defective memory in accordance with the first embodiment of the invention.

FIG. 3 shows a block diagram of a system for processing a partially defective memory in accordance with the first embodiment of the invention. In FIG. 3, the code-loading system 20 includes a CPU1, a RAM 3, a ROM 5, an I/O interface 7, and a storage media 9. And since the related information has been described in FIG. 1, there is no description here. In the embodiment, the code-loading system 20 is ready to load an executable object code that is compiled from a source code into an external memory IC 30. The external memory IC 30 can be a simple memory IC such as a flash memory, an EEPROM (electrically erasable programmable read-only memory), and a memory of a system-on-a-chip (SOC) or micro-controller. A tester 32 is used for testing if a defective memory cell is included in the external memory IC 30. The tester 32 can be included in the code-loading system 20, or can be a stand-alone tester, or a self-testing circuit built in a single chip computer or micro-controller. A test generally writes in a fixed test pattern and then reads it out, thereby determining whether there is a memory cell that can't be normally written in/read out. The storage media 9 of the code-loading system 20 stores a plurality of pre-compiled object codes OBJ0~OBJn, and these pre-compiled object codes are all generated from a source code and are all executable machine codes while each pre-compiled object code respectively has a skipped-code-address range that is filled with one or several segments of dummy codes, corresponding to various defect distribution types (also including a defect-free type). The pre-compiled object code OBJ0 indicates a standard object code that has not been filled with the dummy codes for the aforementioned purpose. Therefore, if the external memory IC 30 includes defective memory cells and the defect distribution type of the external memory IC 30 is identified, the CPU 1 in the code-loading system 20 can select a matching pre-compiled object code, whose skipped-code-address range covers the defective memory cells. Therefore, the defective memory IC 30 can still normally store executable object codes or machine codes.

Figure 4:
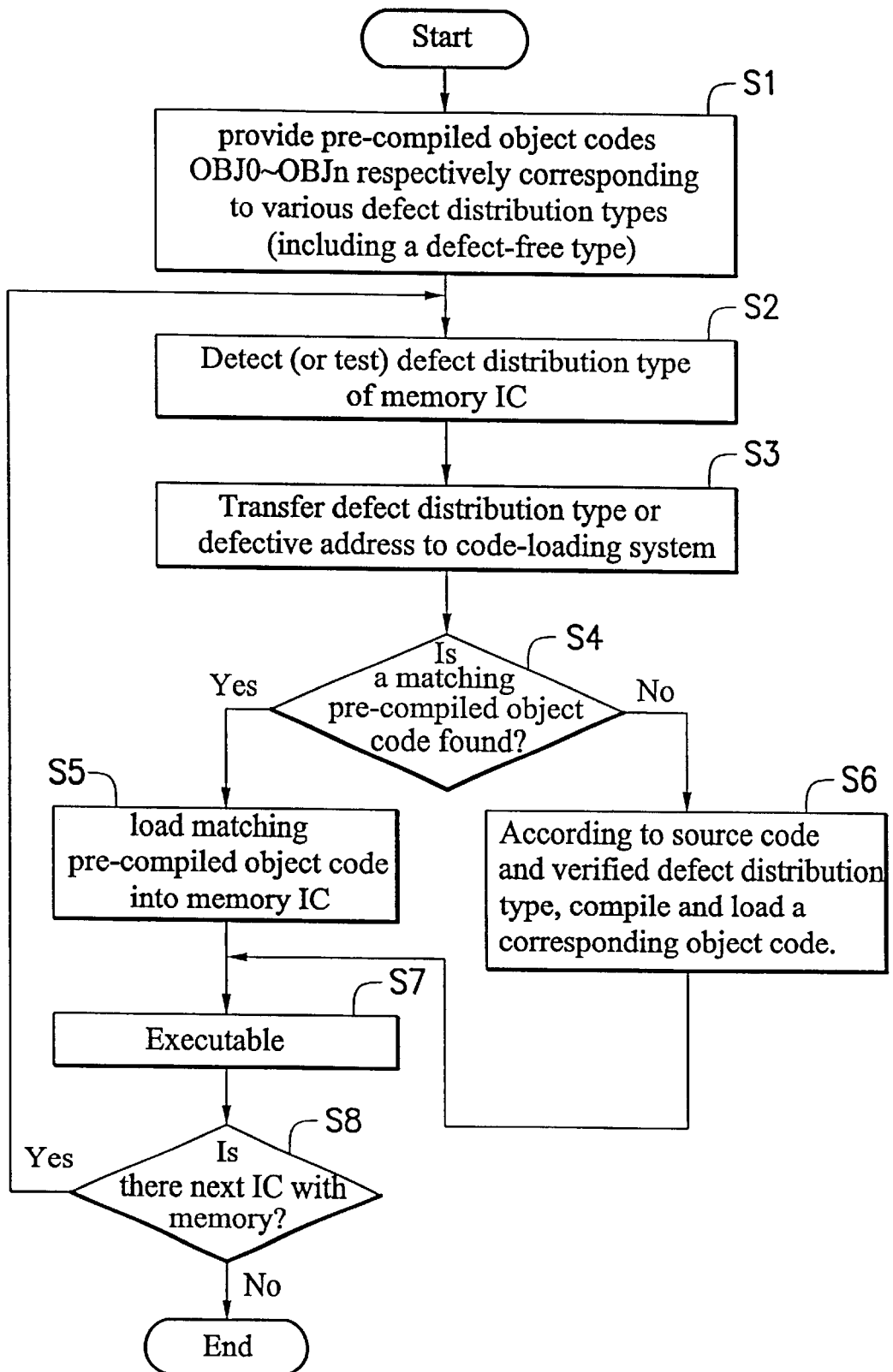
FIG. 4 shows a flowchart of a method of processing a partially defective memory in accordance with the first embodiment of the invention.
Figure 5:
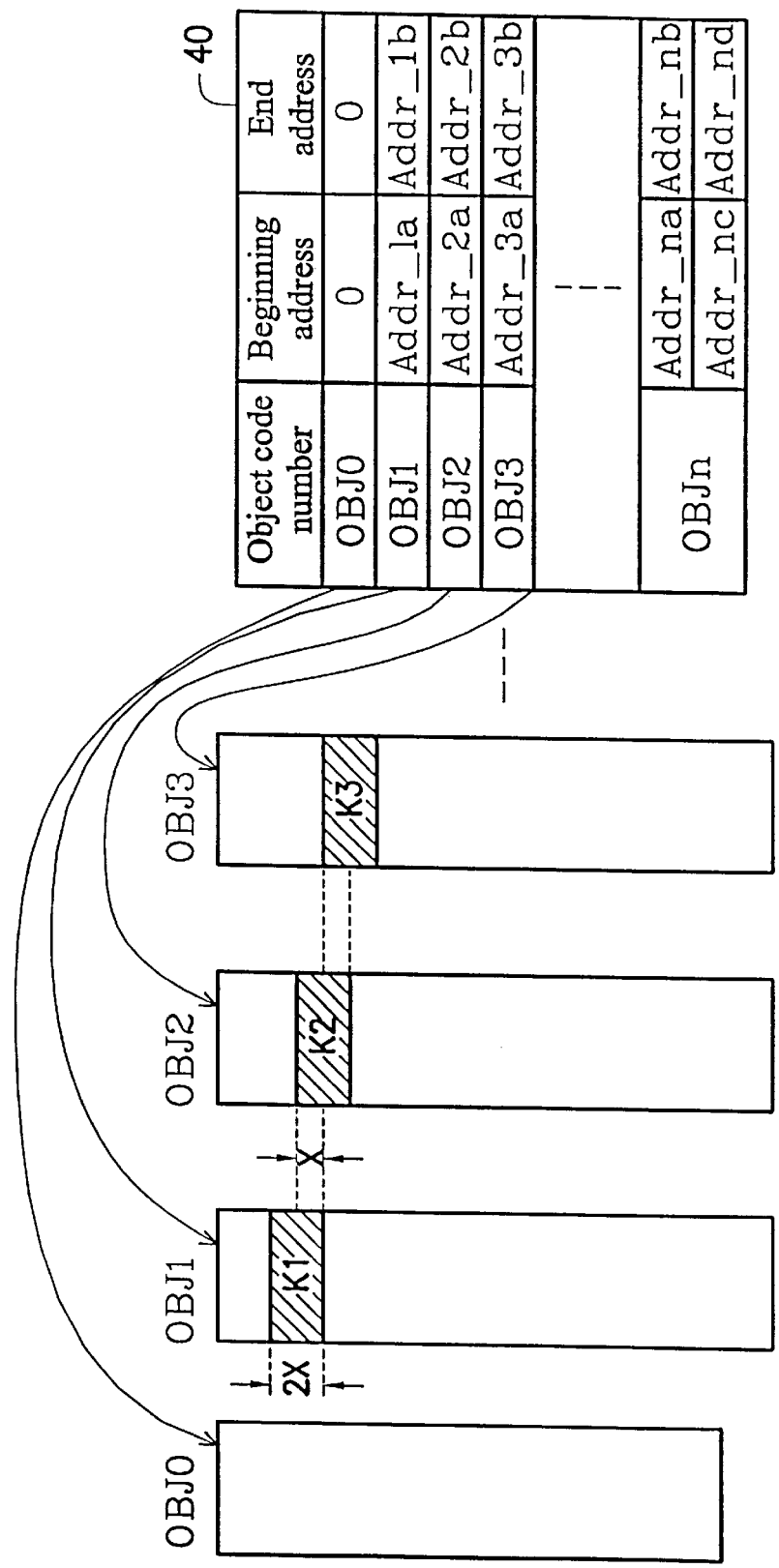
FIG. 5 shows an exampled diagram of the skipped-code-address range of each pre-compiled object code in accordance with the first embodiment of the invention.

FIG. 4 shows a flowchart of a method of processing a partially defective memory in accordance with the first embodiment of the invention. At first, in the step S1 the code-loading system 20 provides the pre-compiled object codes OBJ0~OBJn compiled from a source code, and each pre-compiled object code corresponds to a different type of defect distribution. FIG. 5 shows a schematic diagram of the skip-code-address range of each pre-compiled object code in an ideal status. In FIG. 5, the skipped-code-address range K1 of the pre-compiled object code OBJ1 includes at least 2X addresses, and the skipped-code-address ranges K2, K3, . . . of the other pre-compiled object codes OBJ2, OBJ3, . . . also include approximate address ranges. There is an overlap of at least X addresses between adjacent pre-compiled object codes. Based on this mode, any consecutive defective addresses of the length within X addresses can sure be covered. For example, if the standard object code OBJ0 contains the length of 10,000 bytes and it is desirable to cover defective memory cells that span no more than 5% (that is, 500 bytes), then each pre-compiled object code should have at least 2X=1000 bytes of skipped-code-address range with an overlap of at least X=500 bytes between adjacent codes. As a result, there will be approximately 20−1=19 pre-compiled object codes plus the standard object code OBJ0 to meet this requirement.

However, limited by the locations of break points and having to add a JMP instruction before the skipped-code-address range to connect a broken program code, the skipped-code-address range different from that in the aforementioned ideal situation practically has the difference of several bytes. Therefore, in the embodiment the storage media 9 also stores a skipped-code-address table 40, which marks the code number of each pre-compiled object code, and the starting address and ending address of the skipped-code-address range. For example, the skipped-code-address range K1 of the pre-compiled object code OBJ1 starts from the address Addr_1a and ends at the address Addr_1b. In fact, a pre-compiled object code also can cover over two skipped-code-address ranges; for example, the two skipped-code-address ranges of the pre-compiled object code OBJn are respectively from Addr_na to Addr_nb and from Addr_nc to Addr_nd. According to the aforementioned example, the number of pre-generated codes that has two skipped-code-address ranges is (19*18)/2=171 as far as an object code with the length of 1000 addresses is concerned. By using the skipped-code-address table 40, the code-loading system 20 may correctly determine the pre-compiled object codes that correspond to various types of defect distribution. It will be described later how various pre-compiled object codes are generated from a source code.

Back to FIG. 4, in the step S2 the tester 32 detects or tests the external memory IC 30 to decide the defect distribution type or the defective address thereof. For example, a standalone memory such as a flash memory IC, an EEPROM can be tested by using a general tester; a memory IC in a SOC or a micro-controller can perform a test via the built-in test routine. It is well known that defective memory cells can be located by alternatively writing "1" and "0" in each bit location and then verifying the results.

In the step S3 all the defect distribution types or the defect addresses obtained from a test are transferred to the code-loading system 20. In the step S4, the CPU 1 finds a matching pre-compiled object code via checking the skipped-code-address table 40 according to the defective-memory locations or defect addresses. If the matching pre-compiled object code is found, it is loaded into the external memory IC 30 in the step S5, and further since the defective memory cells won't be used to store a useful program code, the matching pre-compiled object code is normally executed in the step S7. On the other hand, practically the number of the pre-compiled object code is limited; for example, in the embodiment two skipped-code-address ranges at most are pre-compiled in advance, but if the quantity of the defective memory cells is extremely dispersed or extra large defect exists in the external memory IC 30, the matching of pre-compiled object code may not be necessarily found. In this situation, one solution is to abandon the memory IC directly, and the other solution is as the step S6. In the step S6, a corresponding object code can be directly compiled on the spot based on the source code and the verified defect-distribution type; the newly generated object code can be re-stored in the storage media 9 and an index is added to the skipped-code-address table 40 for subsequent use. If the step S8 judges that there is still a next IC with a memory, then the process goes back to the step S2 and repeats the aforementioned steps; if not, the procedure is ended.

In the steps S1 and S6 of the aforementioned procedure, it is necessary for the same source code to generate an executable object code with a dummy code filled in a predetermined location(to a pre-compiled object code, it is the appointed skipped-code-address range, while to an object code compiled on the spot, it is the verified address of defect distribution). There are two methods to generate such an object code. The first method is to modify the source code. The second method is to modify the compiled object code. The two methods are described in detail, respectively, below.

Modifying the Source Code

In the generating pattern by modifying the source code, before the source code is compiled or during the compiling process, the source code itself is modified to generate the object code that corresponds to the skipped-code-address range. For example, the compiler instruction is added to the source code, and thereby the compiler inserts dummy codes within the skipped-code-address range during the process of the first compiled address-calculation, while the other normal machine codes are sequentially compiled at the other locations, and the jump instructions for connecting codes are built so as to skip the skipped-code-address range. Therefore, the compiled object code has the corresponding skipped-code-address range and in an executable state.

Figure 6:
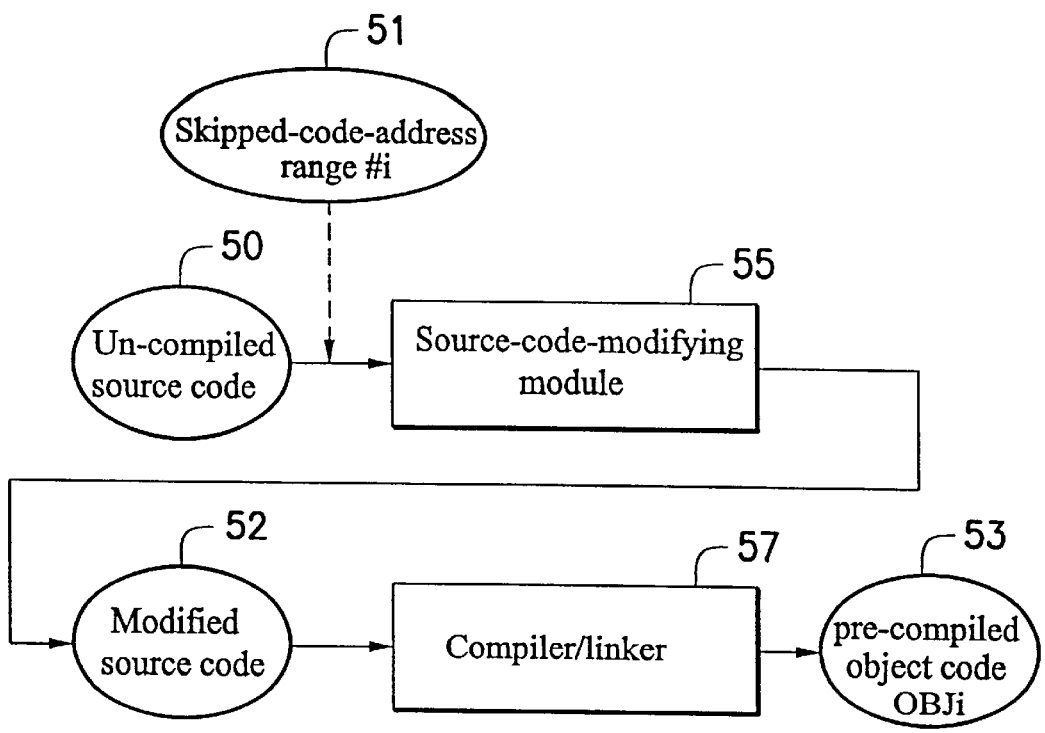
FIG. 6 shows a basic flowchart of generating a pre-compiled object code by modifying a source code in accordance with the first embodiment of the invention.

FIG. 6 shows a basic flow chart of generating a pre-compiled object code by modifying a source code according to the first embodiment of the invention. In FIG. 6, the source-code-modifying module 55 reads in the un-compiled source code 50, and based on the verified skipped-code-address range (#i)51, corresponding instructions are added to the un-compiled source code 50 so that the desired skipped-code-address range is informed. The modified source code 52 may generate the desired pre-compiled object code (OBJi)53 via the compiler/linker 57.

Modifying the Object Code

Figure 7:
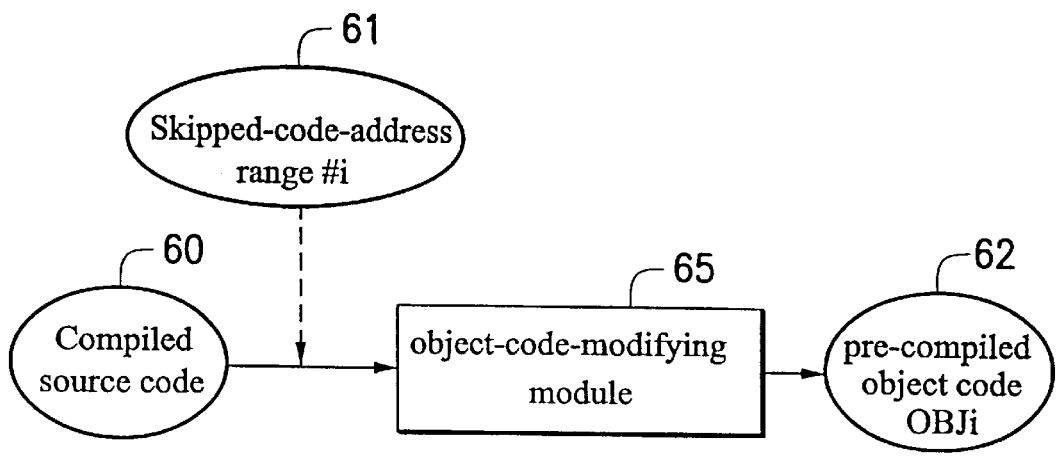
FIG. 7 shows a basic flowchart of generating a pre-compiled object code by modifying an object code in accordance with the first embodiment of the invention.

Though the problem of generating a pre-compiled object code can be solved by modifying the source code, the compiling efficiency usually depends on the compiler itself, and corresponding compilers are necessary for various program languages. The other solution is directly modify the object code, and the method applies equally well to a source code in any program language. FIG. 7 shows a basic flow chart of generating a pre-compiled object code by modifying an object code according to the first embodiment of the invention. The compiler is first used to compile a source code to generate the compiled object code 60 (i.e. the aforementioned OBJ0). Based on a predetermined skipped-code-address range (#i)61, an object-code-modifying module 65 modifies the compiled object code 60 to generate the pre-compiled object code (OBJi)62 that is desired. The purpose of the object-code-modifying module 65 is move the code within the predetermined skipped-code-address range to another address, connect the moved code and the original part in execution sequence, and modify the reference addresses therein.

Figure 8:
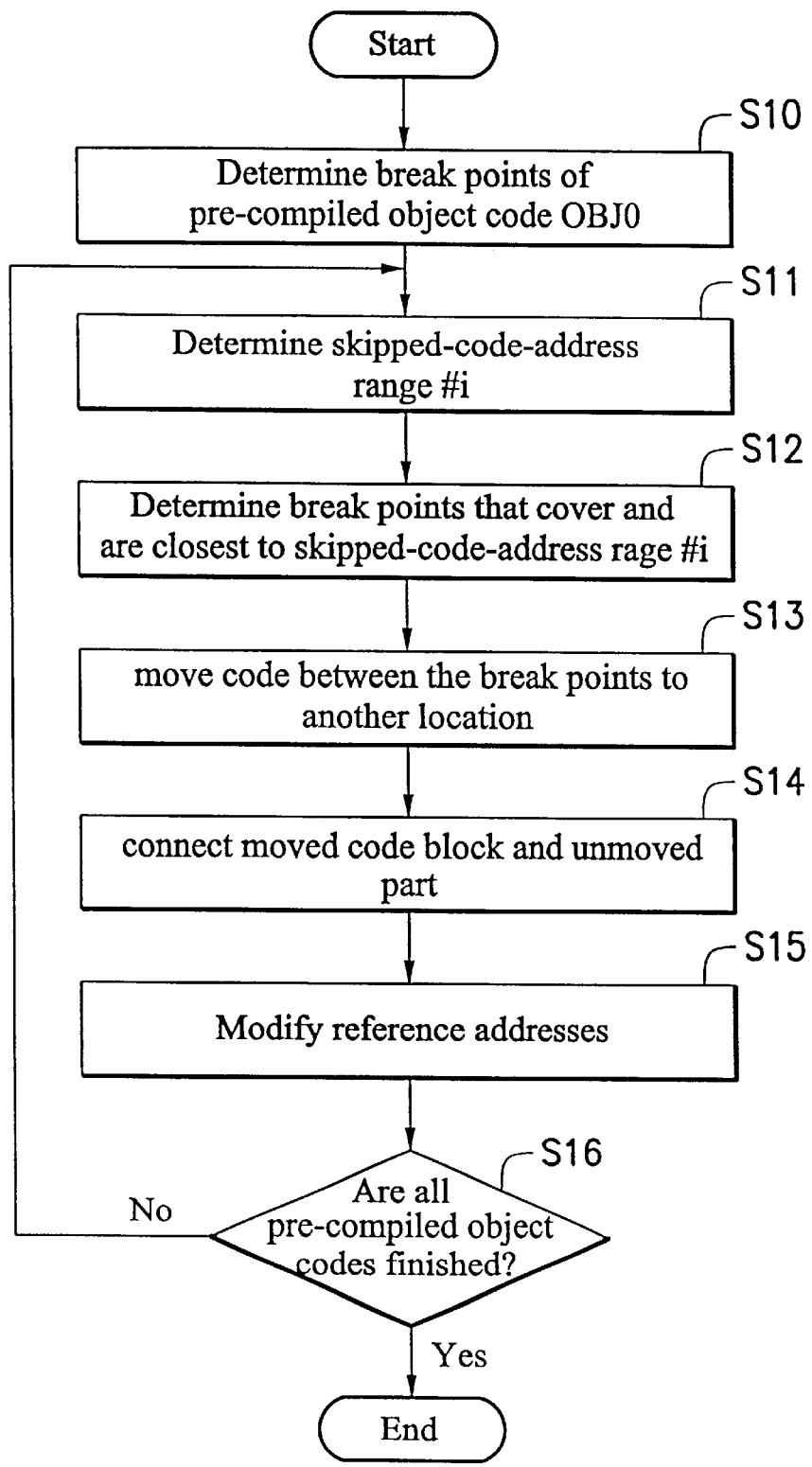
FIG. 8 shows a flowchart of a method of processing the object-code-modifying module of FIG. 7.

FIG. 8 shows a flow chart of a method of processing the object-code-modifying module 65. First, in the step S10, a plurality of break points of the compiled object code 60 are determined (for example, the compiled object code 60 is scanned to find all the break points). In a general machine code program, every complete instruction in an instruction segment can be regarded as breakable. Because this type of code can be fragmented when the CPU is executed, it can still correctly decode instruction messages. On the other hand, the data segments and the stack segments cannot be randomly separated from each other because there might be some correlation between various data items, such as array data structures that cannot be recognized until executed. In addition, the CPU cannot directly distinguish the instruction segments from the other segments in a machine code program. Therefore, the CPU has to scan the whole instruction segments in the compiled object code 60 to decipher all possible break points.

Figure 9:
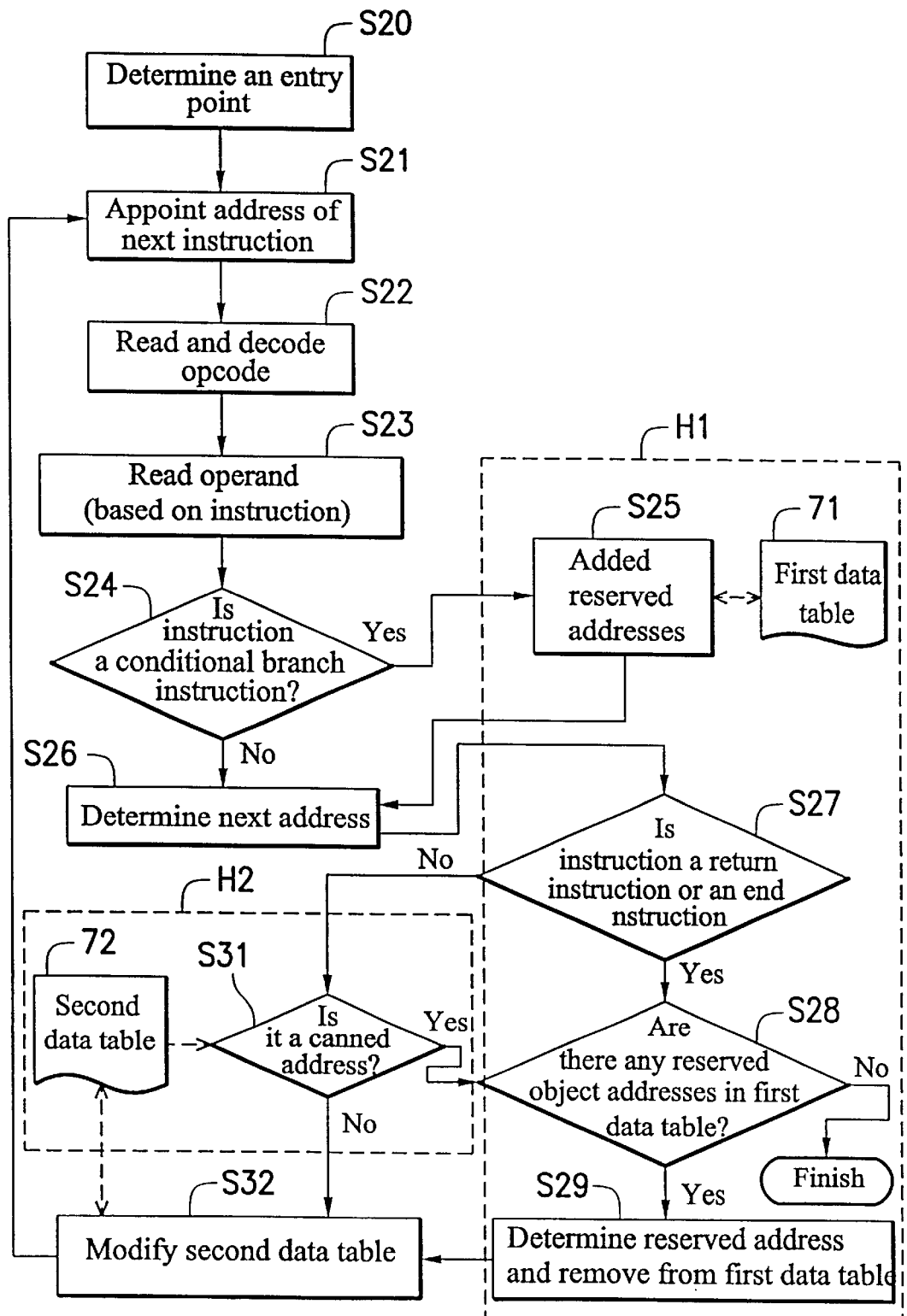
FIG. 9 shows a flowchart of scanning an object code in accordance with the first embodiment of the invention.

FIG. 9 shows a flowchart of the method of scanning the compiled object code 60 in this embodiment. The term "scanning" herein includes the steps of retrieving opcodes, decoding the opcodes and retrieving operands. Execution actions are not required. To completely scan the whole instruction segments in the compiled object code 60, two particular instruction types that are often seen in a general machine code program, including branching and looping, have to be dealt with in particular.

A branch-type instruction can generate two different execution sequences. For example, the branch-type instruction can be one of the conditional branch instructions, such as JNE (Jump if Not Equal), JE (Jump if Equal) and JG (Jump if Greater than Equal). In order to ensure scanning of all instructions, it is necessary to scan two possible execution sequences during the scanning process. In this embodiment, a first data table 71 is setup prior to the scanning process. When a conditional branch instruction is scanned, we can save the next address of the branch instruction or the branch-to address of the branch instruction in the first data table 71. Therefore, after the scanning of one execution sequence is finished, the other execution sequence can be scanned by cross-referencing the first data table 71. In fact, branch-type instructions also include unconditional branch instructions, such as JMP (Jump). Since this kind of branch-type instructions will not incur two possible execution sequences, the scanning process in this embodiment continues as usual and the next scanned address is the branch-to address of this instruction.

On the other hand, the loop-type instructions can sometimes induce endless scanning. In this embodiment, a second data table 72 is previously setup before the scanning process for recording the address range that has been scanned. The second data table 72 is updated every time as an instruction is scanned. When an inner loop is repeatedly scanned, it can be judged according to the second data table 72 that these instructions have been scanned and therefore the subsequent instructions can be excluded from subsequent scanning.

All of the steps shown in FIG. 9 are described in detail below. First, the entry point of the program is acquired (S20) Then, the address of the next instruction is assigned and appointed (S21). According to the address, the opcode of the next instruction is read and decoded (S22). If the instruction requires one or more operand(s), the operand is read from the subsequent address (S23). Once the complete instruction is read, a break point can be recorded. Next, the loader judges if the current instruction is a conditional branch instruction (S24). If so, there are two possible alternatives to proceed with scanning. The first option is to add the branch-to address of this conditional branch instruction to the first data table 71 (S25) and continue scanning the program from the next address of the conditional branch instruction. The alternative is to add the next address of the conditional branch instruction to the first data table 71 and then continue scanning the program from the branch-to address of the conditional branch instruction. Then, the next address to be scanned is determined (S26) and the loader judges if the instruction at this address is a return instruction (such as RET) or a termination/end instruction (such as END) (S27). If the instruction at the next address is not a return instruction or a termination/end instruction, the loader judges, according to the second data table 72, if the address is in the scanned address range (S31). If the next address is not in the scanned address range, the second data table 72 is modified so as to update the scanned address range (S32) and then the scanning proceeds from the next instruction. If in step S27 the instruction at the next address is indeed a return instruction or a termination/end instruction, or in the step S31 the next address is in the scanned address range, the loader judges if there is any address ready to be scanned in the first data table 71. If so, the address ready to be scanned is moved out of the first data table 71 (S29) and the scanned address range defined in the second data table 72 is updated (S32). The scanning procedure can then continue from the fetched address retrieved from the first data table 71. If there is no stored address ready to be scanned stored in the first data table 71, it means that all the instructions in the program have been scanned. Meanwhile, all the break points, the instruction segments and the data/stack segments have been sequenced in the compiled object code 60. In FIG. 9, the dotted box H1 indicates the related steps that deal with the branch-type instructions and the dotted box H2 indicates the related steps that deal with the loop-type instructions.

Back to FIG. 8, in the step S11 the skipped-code-address range #i is set. Then in the step S12, according to the break points generated by scanning the compiled object code 60 and the skipped-code-address range #i, two break points that cover the skipped-code-address range #i are located, and the two break points are close to the skipped-code-address range #i. Any location between complete instructions can be a break point. It is noted that if there are a plurality of skipped-code-address ranges, the corresponding break points can be obtained by using the same method respectively. To simplify the explanation, the following description takes a single skipped-code-address range as an example. The instruction segments (probably also including data/stack segments) between the aforementioned first break point and second break point need to be moved to the another location so as to be added to a skipped-code-address range. In this embodiment, the way to decide a first break point and a second break point is that they must be close to the matched code address but with several bytes remaining in between. That is, there are still several good memory cells between the first/second break points and the defective address for storing linking instructions JUMP.

Then, in the step S13 the code between the break points is moved to another location. After re-addressing the moved code, then in the step S14 certain linking instructions must be inserted so as to maintain the executing sequence of the original program if the moved code includes instructions. The connection is easily achieved by inserting two unconditional branch instructions (JMP). The first unconditional branch instruction is inserted at the address of the first break point and the branch-to address of the first inserted branch instruction is directed at the beginning of the moved code. The second unconditional branch instruction is inserted after the moved code and the branch-to address of the second inserted branch instruction is directed at the second break point. Therefore, when the first inserted unconditional branch instruction at the address of the first break point in the modified machine code program is executed, the execution sequence will jump to the moved code via the first inserted unconditional branch instruction. When the instructions of the moved code have been completely executed, the execution sequence will jump back to the instruction at the address of the second break point via the second inserted unconditional branch instruction.

Figure 10:
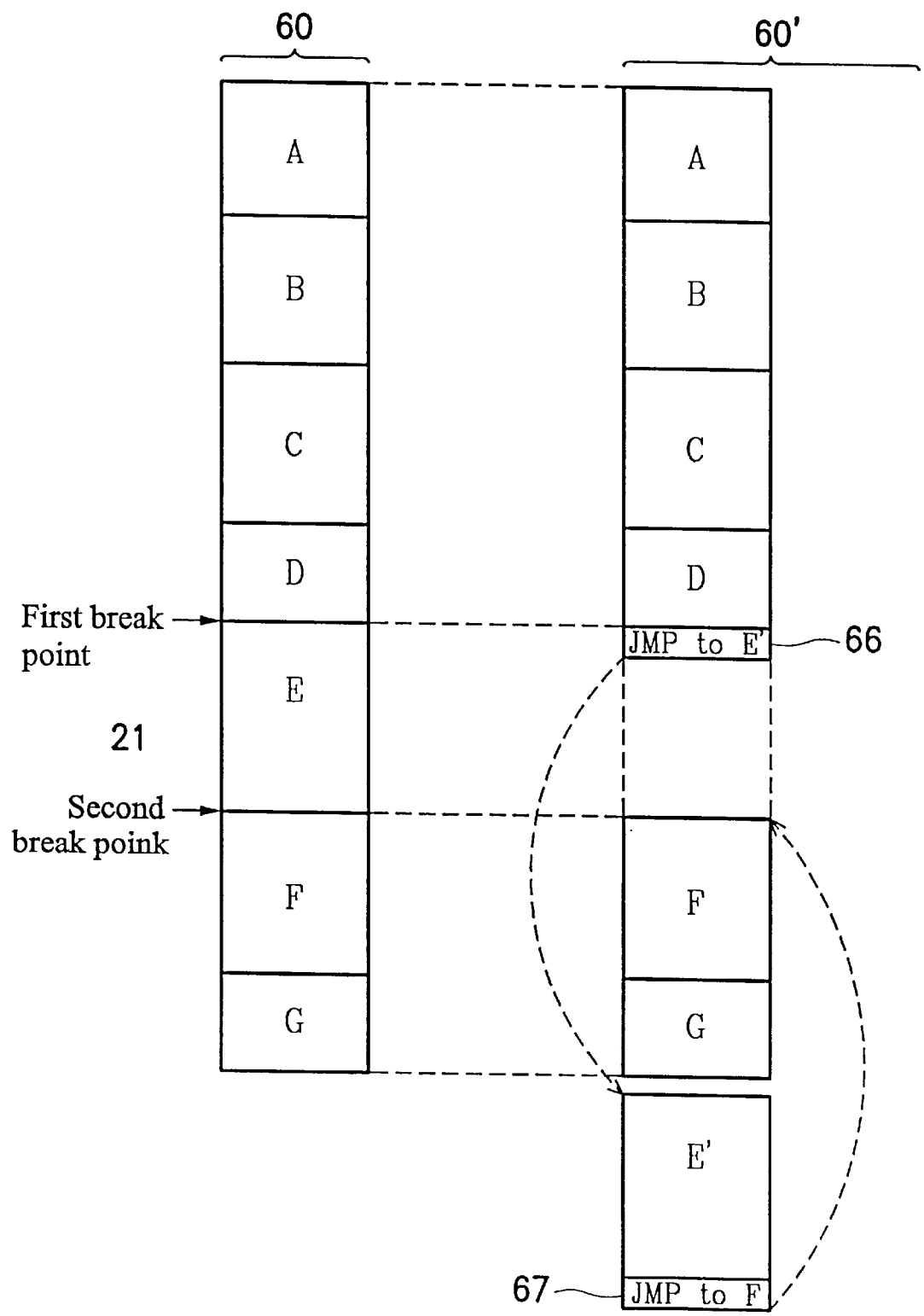
FIG. 10 shows a diagram illustrating the procedure of connecting a moved code to other portions that are stationary in accordance with the first embodiment of the invention.

FIG. 10 is a diagram of connecting the moved code to the unmoved portions of the compiled object code program in this embodiment. As shown in FIG. 10, the compiled object code 60 includes the code segments denoted by A to G. If the code segment E corresponds to a predetermined skipped-code-address range, the first break point and the second break point are decided as the beginning and the end of code segment E. When the code segment E is moved to a new address range, the moved code segment is denoted by E'. The numerals 66 and 67 respectively indicate the inserted first and second unconditional branch instruction. When code segment D is completely executed, the execution sequence jumps to the moved code segment E' via the first unconditional branch instruction 66. When the moved code segment E' is completely executed, the execution sequence jumps back to the code segment F via the second unconditional branch instruction 67. Therefore, the execution sequence of the original code program can be maintained and only two additional unconditional branch instructions must be executed.

Figure 11:
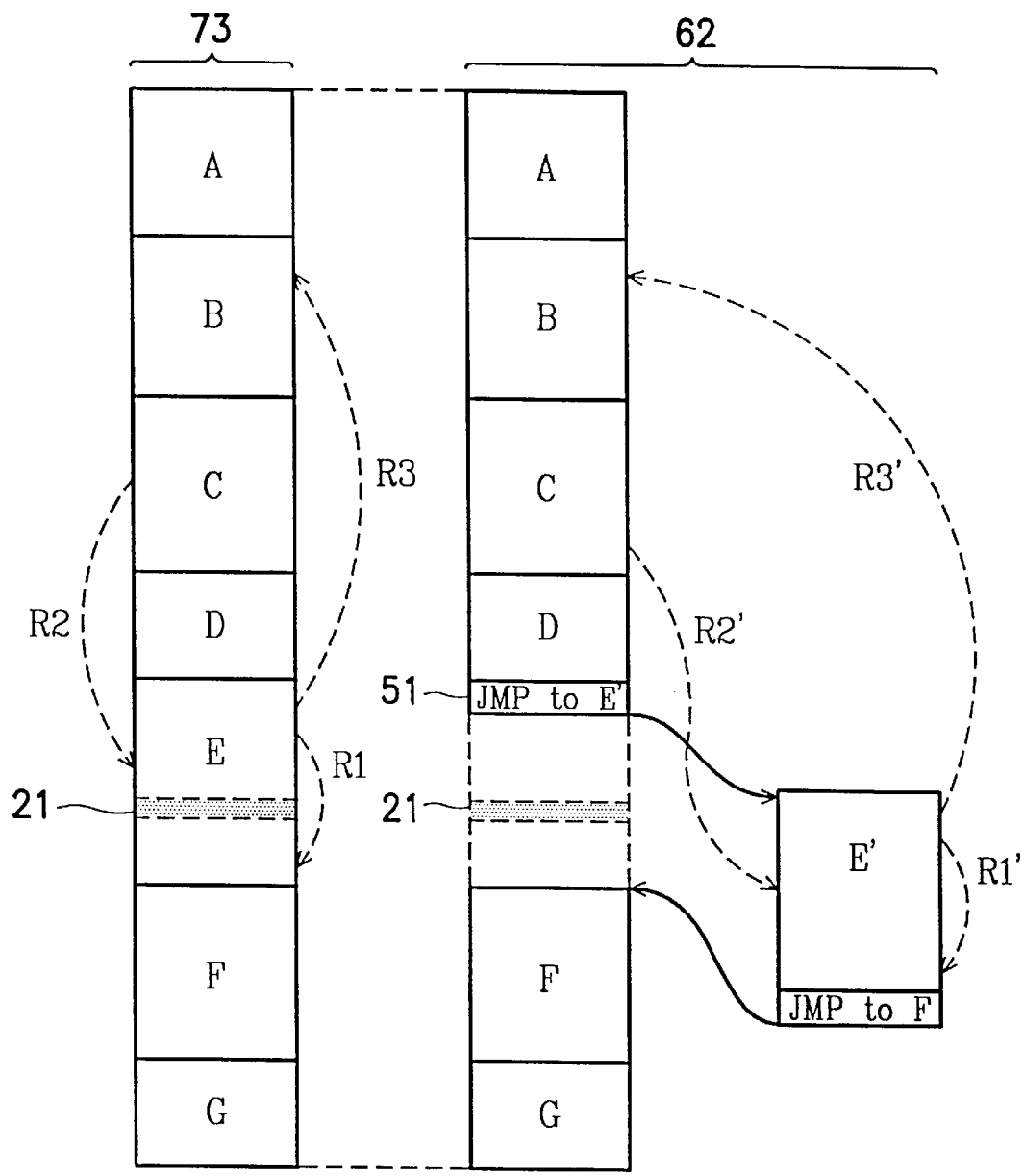
FIG. 11 shows a diagram illustrating the procedure of modifying reference addresses in accordance with the first embodiment of the invention.

When the linking step S14 is finished, in the step S15 the issue of reference addressing is modified. FIG. 11 shows a schematic diagram of modifying reference addresses in this embodiment. As shown in FIG. 11, three reference addressing cases are related to the moved code segment E. They are denoted by R1, R2 and R3. R1 indicates the case in which the addressing reference used in an instruction of code segment E is directed at the address in code segment E. R2 indicates the case in which the addressing reference used in an instruction in the other code segment is directed at the address in code segment E. R3 indicates the case in which the addressing reference used in an instruction in code segment E is directed at the address in some other code segment. These addressing references have to be modified (denoted by R1', R2' and R3') after the code segment E is moved to be the code segment E', so as to generate the executable pre-compiled object code OBJi.

The first step of modifying the addressing references is that the whole compiled object code 60 is scanned again to find the addressing references that are related to the code segment E. In general, there are two modes of addressing references. One is the relative addressing mode and another is the absolute addressing mode. In view of the two addressing modes and the three kinds of addressing references mentioned above, there are six cases that should be considered. In the case of the addressing reference R1, only the addressing references in the absolute addressing mode need to be modified. In the case of the addressing reference R3, only addressing references in the relative addressing mode need to be modified. In the case of the addressing reference R2, the addressing references in both of the absolute addressing mode and the relative addressing mode need to be modified. In addition, the addressing references in the absolute addressing mode, which are all directed to the code segment E, can be modified by adding the relative shift length between the original code segment E and the moved code segment E' to the original addressing references. Similarly, the addressing references in the relative addressing mode also can be modified by using the relative shift length between the original code segment E and the moved code segment E'. Therefore, the executable pre-compiled object code OBJi can be generated.

Then, in the step S16, judge if other pre-compiled object codes are necessary to be generated. If so, the process goes back to the step S11 to execute each step again; if not, the process of generating pre-compiled object codes is ended. In addition, the skipped-code-address range that corresponds to each pre-compiled object code can also be recorded in the file header of each pre-compiled object code besides building the aforementioned skipped-code-address range.

Figure 12:
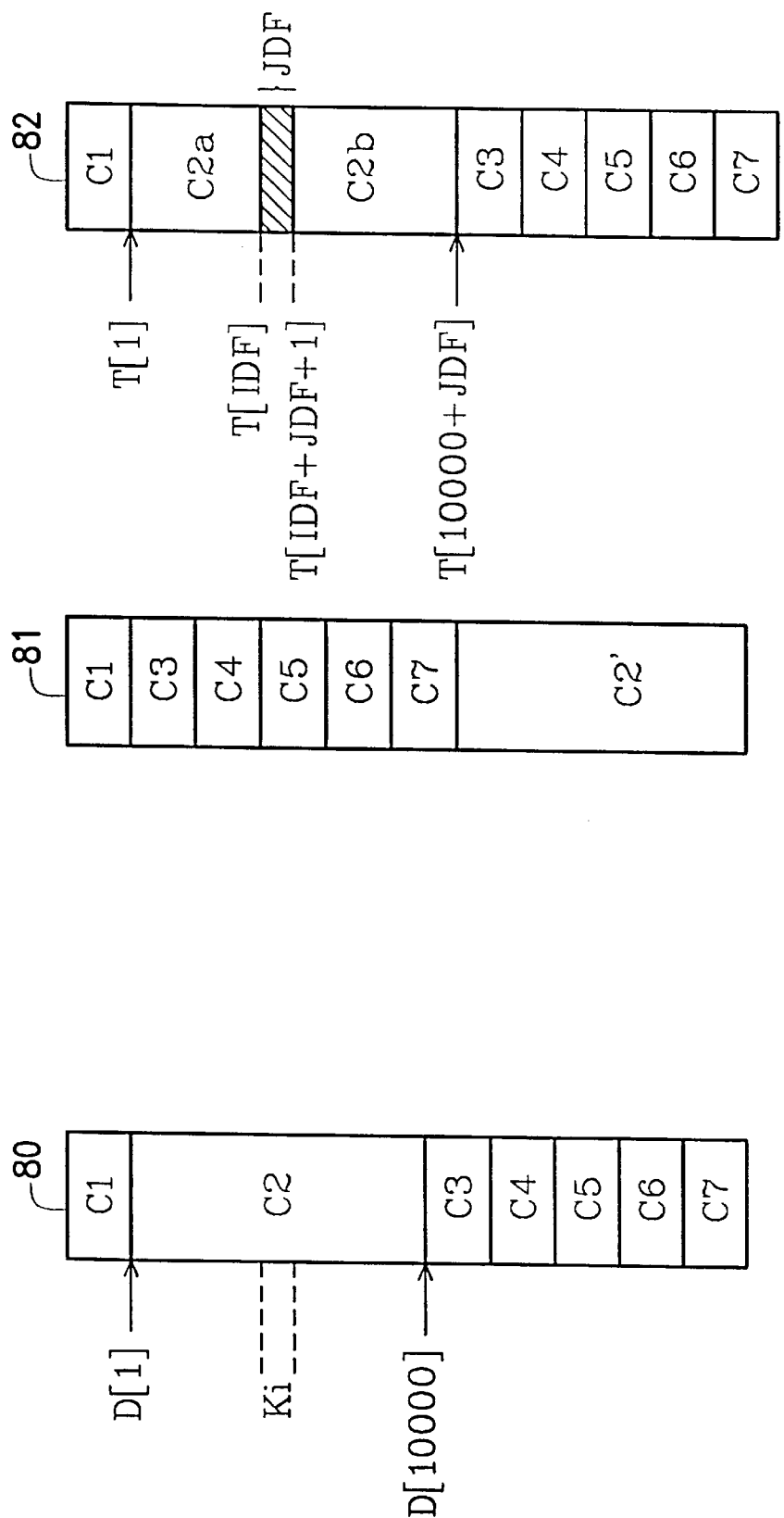
FIG. 12 shows a schematic diagram of processing data segments for an object code while generating a pre-compiled object code in accordance with the first embodiment of the invention.

The processing method in FIG. 9 can also judge the instruction segment and the data segment; however, the data segment is generally unbreakable, and therefore if there is a big-sized data segment that corresponds to a defective address, a larger address space is wasted after break points and a moved program code are determined. FIG. 12 shows a schematic diagram of processing a big-sized data segment according to the first embodiment of the invention. The symbol 80 indicates the standard object code generated according to a general compiler, i.e. the aforementioned OBJ0. The object code 80 includes code segments C1–C7, wherein the code segment C2 is unbreakable, for example T[1]–T[10000]. It is provided that the skipped-code-address Ki of a pre-compiled object code, as shown in FIG. 12, is located in the code segment C2. By using the processing method of FIG. 8, break points are set at the addresses plus 1 of the beginning and end addresses of the code segment C2, and then the whole code segment C2 is moved to other address (such as the address linked after the code segment C7). However, the processing method of this kind may waste a large address space, and if the memory space of the memory IC that the code segment is loaded into is not large, the code segment tends to be too large to be loaded. In the embodiment, there are two methods to solve this problem.

The first method generates new object codes by code shuffle, such as 81 in FIG. 12. The code segment C2' in the object code 81 corresponds to the code segment C2 in the object code 80, wherein the code segments C2 and C2' may be partially overlapped. The object code 81 can be generated via modifying the source code and then addressing the original code segment C2 to the address of the code segment C2' by the compiler, or directly modifying the object code 80. The pre-compiled object codes OBJ1~OBJn can be generated by using the object codes 80 and 81, so as to avoid wasting a large address space due to directly moving the data/stack segment. In detail, if the predetermined skipped-code-address range falls within the code segment C2, the corresponding pre-compiled object code can be generated by modifying the object code 81. Since it is a general program code, which contains a number of break points, at the relative addresses of the code segment C2 in the object code 81, a pre-compiled object code can be generated by moving the least program code. If the predetermined skipped-code-address range falls within the code segment C2', the corresponding pre-compiled object code can be generated by modifying the object code 80, and the same effect is also obtained.

The second method is to divide the data segments, such as 82 in FIG. 12. As shown in the figure, the original code segment C2 is divided into a sub-segment C2a of T[1]~T[IDF] and a sub-segment C2b of T[IDF+JDF+1]~T[10000+JDF], and JDF bytes between the two sub-segments correspond to the skipped-code-address range Ki. The object code 82 containing divided data segments is generated only through modifying the source code, and it is explained by an embodiment as below.

FIGS. 13A, 13B, and 13C show source code modifications before modification. In the source code of FIG. 13A, an array T (program line 100) is first declared to have 10000 memory addresses. In the main program (between program lines 101~103), the device DEV1 sequentially transmits data to the array T (program lines 110~111), an then the array T transmits data to the device DEV2 (program lines 120~121). For example, the original code can be applied to processing memory data of a digital camera, and the device DEV1 can be CCD (Charge Coupled Device) detector which transmits the detected image data to the memory of the digital camera; the device DEV2 can be an USB (Universal Serial Bus) interface circuit through which the stored image data is transmitted outside(such as computer). The data segments that correspond to the array T can be divided via modifying the original code in FIG. 13A to the program code in FIG. 13B.

In the modified source code in the FIG. 13B, program lines 200~201 declare the constants, IDF and JDF, respectively, wherein the constant IDF indicates an item preceding the item in the array T that corresponds to the beginning address of the predetermined skipped-code-address range Ki, and the constant JDF indicates the length of the predetermined skipped-code-address range Ki. In a general program language, constant declaration doesn't occupy memory codes, and the physical value can be modified according to the predetermined skipped-code-address range Ki. Then in the program line 210, the array T is declared to have 10000+JDF memory addresses which includes the original array length and the length of the inserted predetermined skipped-code-address range Ki. In the main program (between program lines 211 to 250), two middle parameters I2 and I3 are first set respectively to point out the end item of the sub-segment code C2a in the new array T(10000+JDF) and the beginning item of the sub-segment code C2b in the new array T(10000+JDF). Then, in the program lines 230~237 data from the device DEV1 is inputted to T(10000+JDF), wherein the program lines 230~233 process the sub-segment code C2a and the program rows 234~237 process the sub-segment code C2b. Then, in the program lines 240~247 data from T(10000+JDF) is inputted to the device DEV2, wherein the program lines 240~243 process the sub-segment code C2a and the program lines 244~247 process the sub-segment code C2b. In the process, memory addresses between T(IDF+1) to T(IDF+JDF) are not stored or sent, that is, the skipped-code function is achieved. The method is more suitable for integrally processing large-sized array data, such as digital camera.

FIG. 13C is another method for modifying a source code, and the modifying method judges all the reading and writing actions related to the data segments by using DO loops and conditions. The program lines 300~301 respectively declare the constant IDF and JDF, which mean the same thing in FIG. 13B. In the program line 310, an array T is declared to have 10000+JDF memory addresses, which includes the original array length and the length of the inserted predetermined skipped-code-address range Ki. In the main program (program lines 320 to 350), in program lines 330 to 336 data from the device DEV1 is transmitted to the array T. In the program line 330 a DO loop is built, which processes all the items of the array T. Then, the program line 332 judges the current pointer I is at the sub-segment code C2a or the sub-segment code C2b. If at the sub-segment code C2a, the pointer K is equal to I; if at the sub-segment code C2b, the pointer K is equal to I+JDF. The program line 335 uses the pointer K to describe the address to which the device DEV1 is going to transmit data. In addition, in the program lines 340~346 data from the array T is transmitted to the device DEV2. By using the same method, the program line 345 uses pointer K to point to the address of the data in the array T, the data being transmitted to the device DEV2. In the process, since data at memory addresses between T(IDF+1) to T(IDF+JDF) are not stored or sent, the skipped-code function is also achieved. In fact, the judging steps in program lines 332~334 and program lines 342~344 can be added prior to all the program lines that need to access the array T, so as to decide the K value (which indicates the physical location in the array T). In other words, the modification of the source code in FIG. 13C is more flexible, which is suitable for processing the whole array as well as an individual location.

According to the embodiment, appropriate pre-compiled object codes can be selected from the pre-compiled object codes that correspond to various defect distribution types, and directly be loaded into a memory IC, and thereby a defective memory IC can still store executable program codes. Further, the embodiment is also applied to setting at least a part of a program code in a ROM (such as flash memory, EEPROM) Meanwhile, the references IDF and JDF in FIGS. 13B, 13C can be set as the contents of the memory addresses in the RAM, so that the contents of IDF and JDF can be changed according to the defective memory address of the data segments.

The Second Embodiment

In the application environment of the first embodiment, executable object codes are written into an external memory IC by using a code-loading system, wherein the processing method which uses various pre-compiled object codes to match defect distribution types can also be applied to other application of writing a memory IC.

Figure 14:
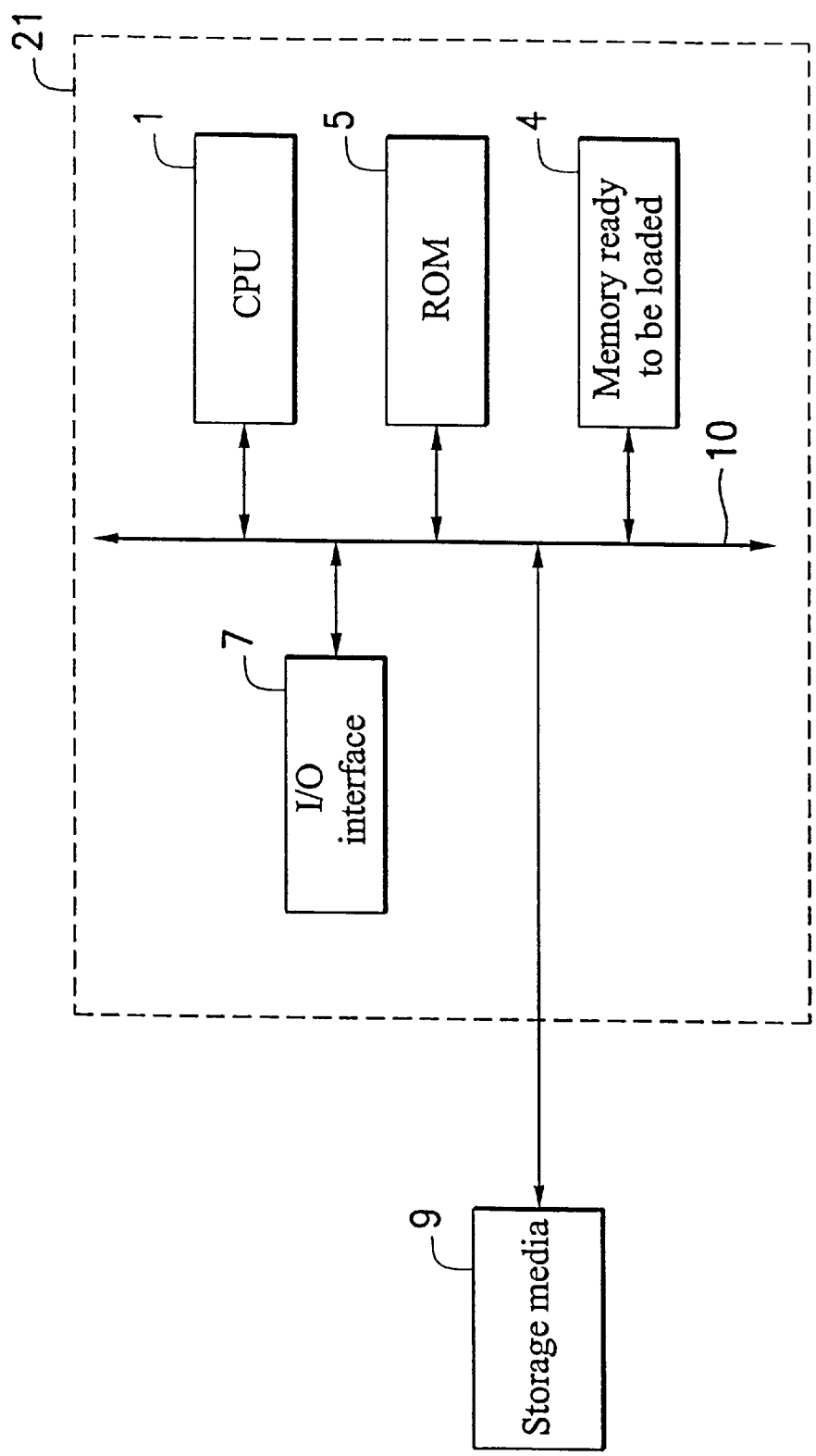
FIG. 14 shows a block diagram of a system for processing a partially defective memory in accordance with the second embodiment of the present invention.

FIG. 14 shows a configuration of a system for processing a partially defective memory according to the second embodiment of the invention. In the configuration shown as FIG. 14, a stand-alone system 21 loads a program code to an internal memory 4 ready to be loaded. The stand-alone system 21 can be a system on a chip, a microcomputer system, or a micro-controller, while the memory 4 ready to be loaded can be a RAM or other non-volatile memory. The ROM 5 in the stand-alone system 21 can store the program code of the flow chart shown in FIG. 4, the CPU1 executes the program code, and the external storage media 9 stores various object codes that are previously compiled. The CPU1 tests memory 4 ready to be loaded so as to locate the defect distribution types. Then, according to the defect distribution types the CPU1 locates an appropriate pre-compiled object code in the storage media 9 so as to load the appropriate pre-compiled object code into the memory 4 ready to be loaded. Except that the defect test can be performed by using the CPU, the other basic process is the same as in the first embodiment. Thereby, the present invention can be suitable for not only processing the memory defect of a stand-alone memory IC but also processing the memory defect of the sub-system such as a system on a chip or a micro-controller.

The Third Embodiment

In the processing procedure of FIG. 4 in the first embodiment, in the step S3 the defect distribution types or defective addresses need to be transmitted to the code-loading system 20. However, in the practical execution, if communication between the code-loading system 20 and the external memory IC is necessary, it means a communication protocol in between has to be built, and the tester 32 or other devices are also needed to execute the communication. This not only makes the whole configuration for loading an object code more complicated, but a tester or other device is also necessary during loading a program. The embodiment solves the problem by using a solution that is more suitable for a production line.

Figure 15:
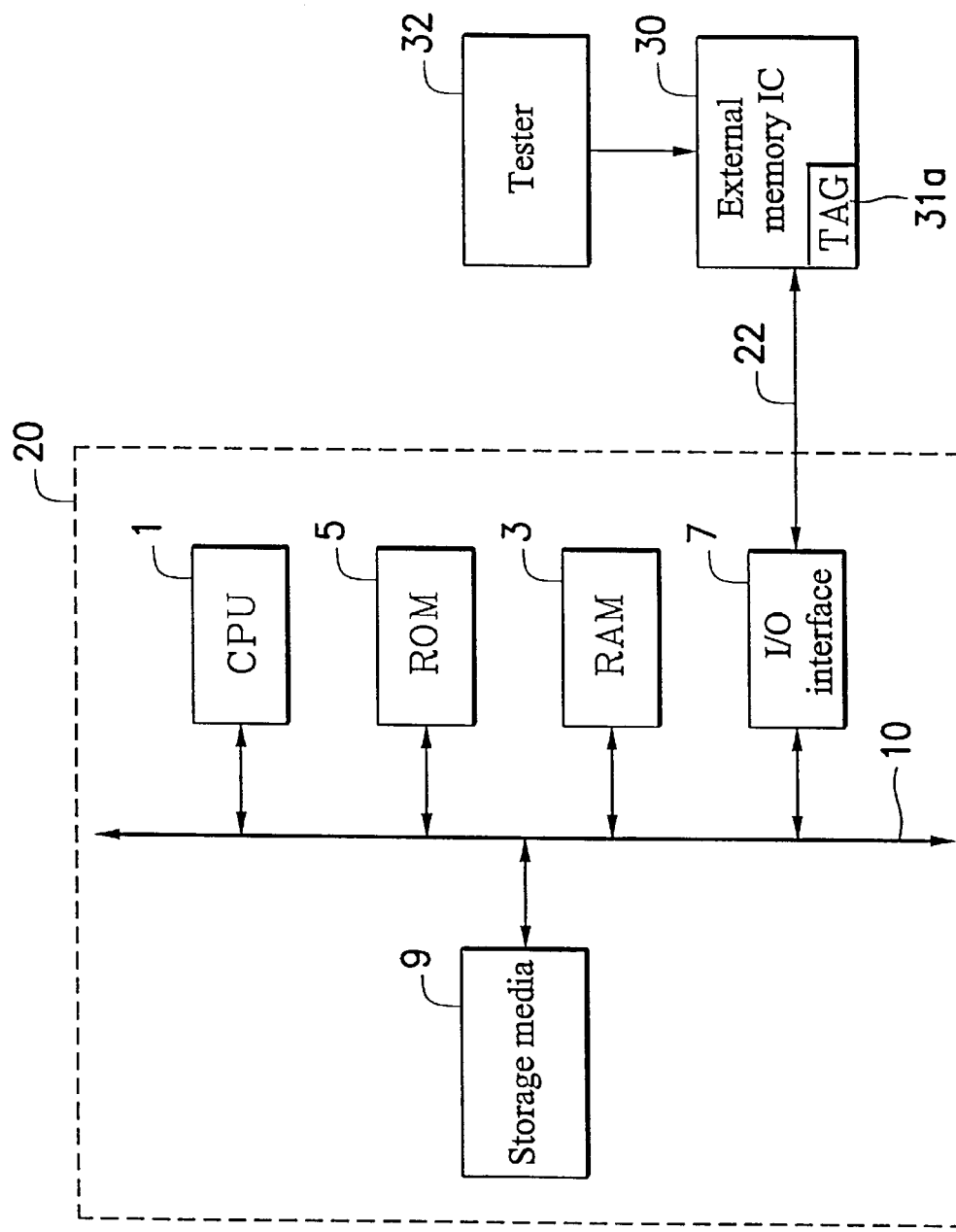
FIG. 15 shows a block diagram of a system for processing a partially defective memory in accordance with the third embodiment of the invention.

FIG. 15 shows a configuration of a system for processing a partially defective memory according to the third embodiment of the invention, and the block configuration is basically the same as that in the first embodiment except that the external memory IC 31 includes a tag memory (TAG) 31a. The tag memory 31a can be a specific memory part that is associated with the external memory, or a particular location (such as the beginning part) in the external memory. When the tester 32 tests the external memory IC 31, the defect distribution types or the defective addresses can be recorded on the tag memory 31a, wherein the defect distribution types can be judged from the practically tested defective addresses. After the tester 32 is finished with testing the whole memory IC, the test result is transmitted to the code-loading system 20 for proceeding the process of loading the code. Therefore, the code-loading system 20 can directly read the defect distribution types or the defective addresses that are stored in the tag memory 31a. By using the method, while loading a program code, the tester 32 or other device doesn't have to be responsible for transmitting defective address messages, and therefore this is more suitable for the application in production line.

Figure 16:
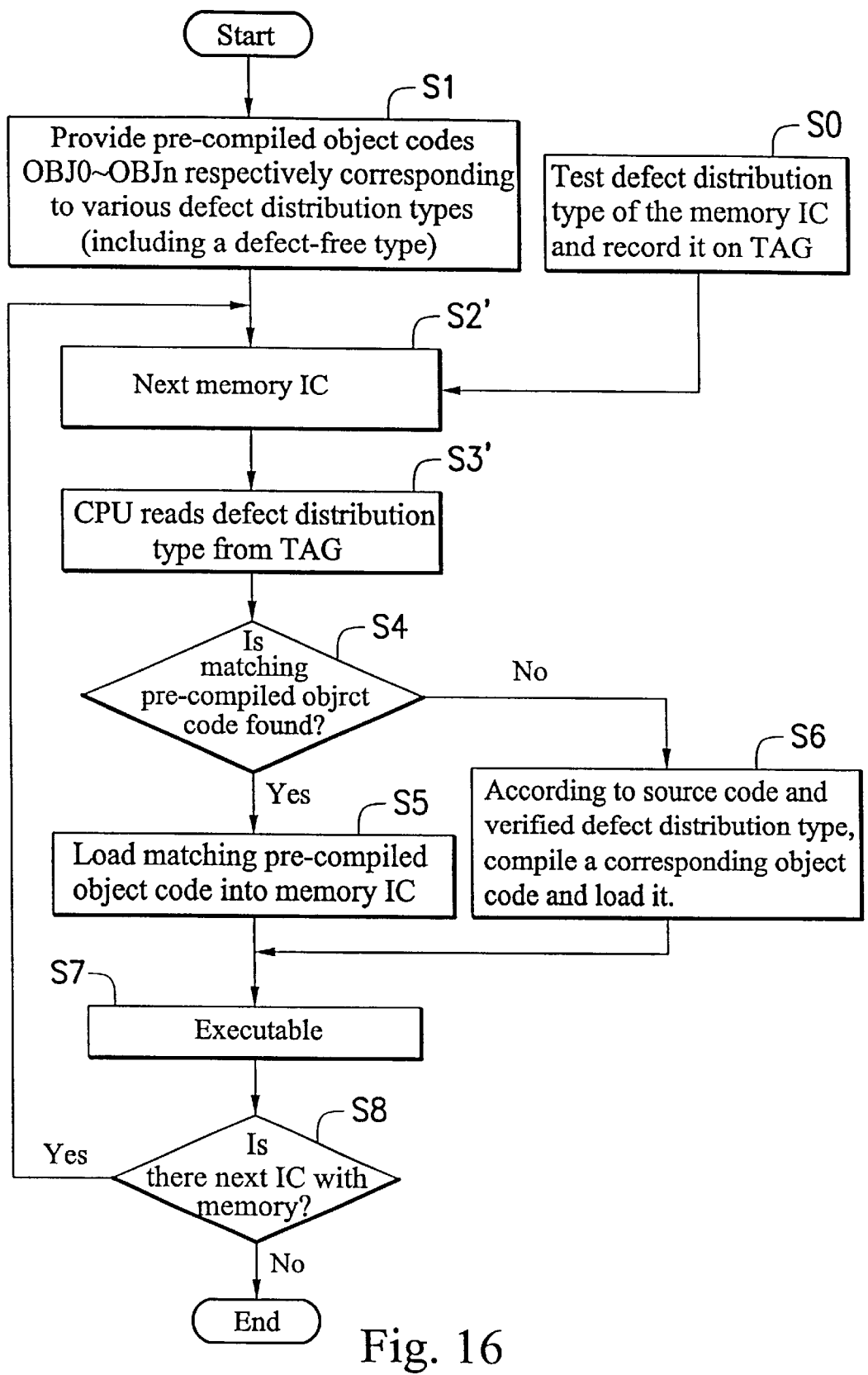
FIG. 16 shows a flowchart of a method for processing a partially defective memory in accordance with the third embodiment of the invention.

FIG. 16 shows a flowchart of a method for processing a partially defective memory according to the third embodiment of the invention, basically the same as that in the first embodiment except that the step S0 replaces the step S2 and the step S3' replaces the step S3. In the step S0, the tester needs to record the result on the tag memory besides testing the defect of the memory IC; in the step S3', the CPU in the code-loading system can directly read the defect distribution types from the tag memory and needn't get the defect messages via the communication protocol. Therefore, the method for processing a defective memory IC is more suitable for the use in the industry without increasing cost.

As mentioned above, the tag memory can be implemented by using the internal memory, such as the beginning part, of the memory IC. In that case, the object can be obtained by reserving a segment of unused addresses, such as 4 bytes, at the beginning part when the compiler generates a pre-compiled object code. Otherwise, a particular code is used as the beginning and end data of the tag code. For example, the beginning data can be set as 55, the end data AA. By using the method, the memory IC can be more assured whether tag code data is included therein. Further, though the internal tag memory of the memory IC is used to achieve the purpose of automation in the embodiment, the same effect can also be obtained by using other marking methods, and it is still within the scope of the invention.

The Fourth Embodiment

In the processing procedure of FIG. 4 according to the first embodiment, the step S6 can compile on the spot the corresponding object code for the defect distribution types that are not supported by the current pre-compiled object code. However, if the method similar to that shown in FIG. 9 is used, that is, the break points are decided and the corresponding object code is generated via scanning a standard object code (i.e. pre-compiled object code OBJ0), the processing efficiency on the spot might be lower. The embodiment provides a processing method that is suitable for compiling object codes on the spot.

Figure 17:
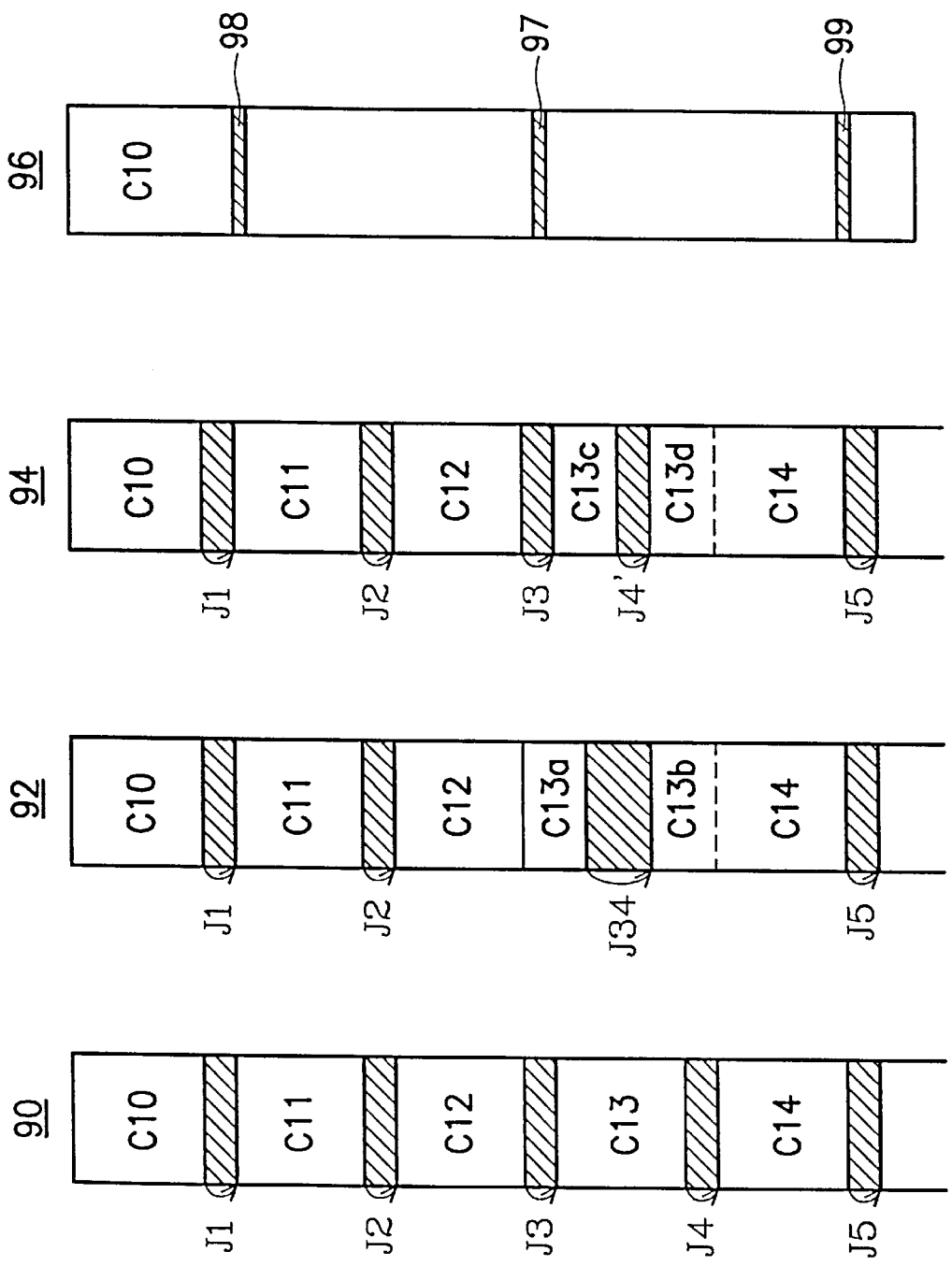
FIG. 17 shows a schematic diagram of a dynamic pre-compiled object code format and a modification format applied to on-site compilation in accordance with the fourth embodiment of the invention.

FIG. 17 shows a schematic diagram of a dynamic pre-compiled object code format and the modification format applied to on-site compilation according to the fourth embodiment of the invention. AS shown in the figure, the symbol 90 indicates the dynamic pre-compiled object code format that is applied to on-site compilation. The dynamic pre-compiled object code 90 includes several breakable code segments C10~C14; the skipped-code segments J1~J5 are inserted between code segments, and the length of each skipped-code segment can be very short and used for connecting the broken code segments C10~C14. For example, each length of the code segments C10~C14 can be set as about 100 bytes, and skipped-code blocks J1~J5 are each set as fixed 5 bytes. Take the assembly language 8086 as an example. The instructions in these skipped-code segments J1~J5 can be expressed as:

| EB 03 | JMP $ +5 |
|---|---|
| 90 | NOP |
| 90 | NOP |
| 90 | NOP |

The NOP instruction segments in these skipped-code segments J1~J5 correspond to the aforementioned skipped-code-address range, for reserving skipped-code space for defective locations, that is, each skipped-code segment can at least process under 3 serial bytes of defective addresses (i.e. the locations of the NOP instructions). Further, the NOP instructions of the aforementioned skipped-code segments J1~J5 can be at least partly changed to address-related information, for showing the code address(es) of one or more adjacent break points.

In FIG. 17, the symbol 96 indicates the memory IC ready to be loaded, wherein the symbol 97 indicates defective addresses. As shown in the figure, the defective addresses 97 are located in the code segment C13. The symbols 92 and 94 indicate a method of generating a corresponding object code, respectively. The object code 92 assembles the two skipped-code segments J3, J4 at the beginning and end of the code segment C13 to be a new skipped-code segment J34, wherein the NOP instruction segment (a total of 8) can be used to cover the defective addresses 97. Further, the original code segment C13 is divided into sub-segments C13a and C13b. It has to be understood that the break point between the sub-blocks C13a and C13b can be decided by scanning the original code segment C13 starting from the nearest break point preceding, and thereby the processing procedure can be greatly simplified. A corresponding object code then can be constructed by further adding a modification for the reference addresses being affected.

Further, if the length of the defective addresses 97 is very short, and the break points of the block code C13 are appropriate, a skipped-code segment can be used alone to cover the defective address 97, such as the object code 94 in FIG. 17. In the object code 94, the original skipped-code segment J4 is moved to the breaking point of the code block C13 to be the skipped-code segment J4', and the code segment C13 can be divided into the sub-segments C13c and C13d by a break point. A corresponding object code then can be completed by further adding a modification for the reference addresses that are affected.

Basically, to generate an executable object code on the spot by using the format of the dynamic pre-compiled object code 90, it only takes a slight code shift and the modification of related reference addresses. For example, in the object code 92, equivalently the sub-segment C13a is moved upward 5 bytes, and the sub-block C13b is moved downward 5 bytes; in the object code 94, equivalently the sub-segment C13d is moved downward by 5 bytes, and the sub-block C13c is unmoved. As to a larger defective-addresses range, more skipped-code segments are moved to cover the range. Thereby, a corresponding object code is generated via only slight modification. In fact, the format of the dynamic pre-compiled object code 90 in the FIG. 17 is very suitable for processing defective addresses in a large quantity but each of short lengths. As shown in FIG. 17, the location of the skipped-code segments J1 or J2 can be moved to cover the defective address 98, and the location of the skipped-code segment J5 can be moved to cover the defective address 99. Usually in this case, the total number of defective addresses in the memory IC is not large, but since the distribution is dispersed too much, the corresponding pre-compiled object code is probably hard to be located. However, the executable code that matches such defect distribution can be easily generated by modifying the dynamic pre-compiled object code 90.

The Fifth Embodiment

In the first embodiment, each skipped-code-address range includes about not less than 2X addresses, and there is an overlap of about not less than X addresses between consecutive skipped-code-address ranges. The skipped-code-address range is divided according to a general rule. In fact, the memory IC is typically organized in a particular configuration, so that the defect may also present a particular type. The memory cell configuration of a general memory IC can be referred to the book "Semiconductor Memories" by Betty Prince, and there is no further description herein. Only the part related to defect types is to be explained. A general memory IC (such as DRAM) consists of a plurality of memory cells in an array arrangement, and each memory cell is located at the orthogonal point of a bit line and a word line. A word line is used to select all the memory cells on a row, and then a bit line is used to read or write data. Provided that defect location on the chip falls on some word line (such as open or short with an adjacent word line), all the memory cells on this word line are practically caused to be unable to work normally. In view of the whole memory IC, a series of defective addresses can be detected, the length of which is a multiple of the length of the bytes corresponding to memory cells that are connected by a word line. For example, if a word line connects 256 memory cells, i.e. 32 bytes, one possible defect distribution is defective addresses of serial 32 bytes or the multiple, such as 64 or 96 bytes. The defect distribution caused by word line defection is referred to as a "word line error" hereinafter.

Figure 18:
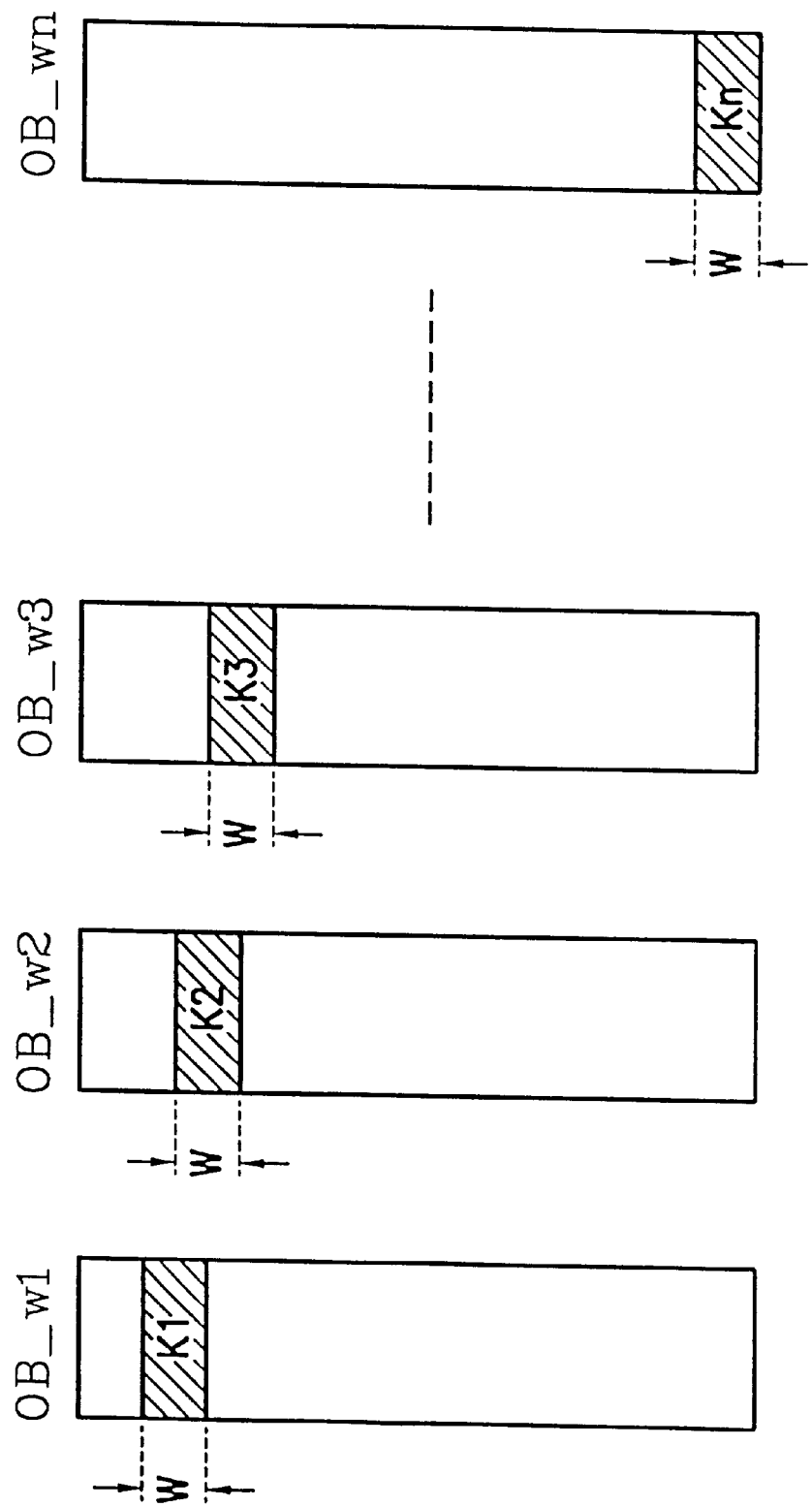
FIG. 18 shows a schematic diagram of the pre-compiled object code corresponding to word-line errors in accordance with the fifth embodiment of the invention.

Since the range of the defective address distribution caused by a word line error covers multiple bytes that correspond to each word line, the arrangement of the skipped-code-address range can be adjusted accordingly. FIG. 18 shows a schematic diagram of the designed pre-compiled object code corresponding to word-line errors according to the embodiment. As shown in FIG. 18, the skipped-code-address ranges K1~Kn in each pre-compiled object codes OBJ_w1~OBJ_wn are basically disposed in sequence in the address space of at least W bytes, wherein W indicates a multiple of the byte length that corresponds to the memory cells (bits) connected by each word line in the memory IC. Limited by the locations of the break points in the program code, the length of each pre-compiled object codes OBJ_w1~OBJ_wn is actually a little longer than W bytes. Further, JUMP can be used to connect the separated program codes, basically the same as described in the first embodiment, and there is no further description herein. Thereby, it is easier to locate the pre-compiled object code that matches the physical defect distribution type.

Besides the aforementioned word line error, another possible defect type in the memory IC is a "bit line error". Same as a word line error, a bit line error causes all the memory cells that are connected to the bit line to be unable to work normally. Note that all the memory cells that are connected to a bit line are not on the bytes of serial addresses. In case of the aforementioned example, the defect distribution type caused by a bit line error occurs every 32 bytes, which can span a large memory address range. In other words, it is hard to find the matching pre-compiled object code designed for matching word-line failures, and therefore it is necessary to prepare pre-compiled object codes that are specific to match bit-line defect type.

Figure 19:
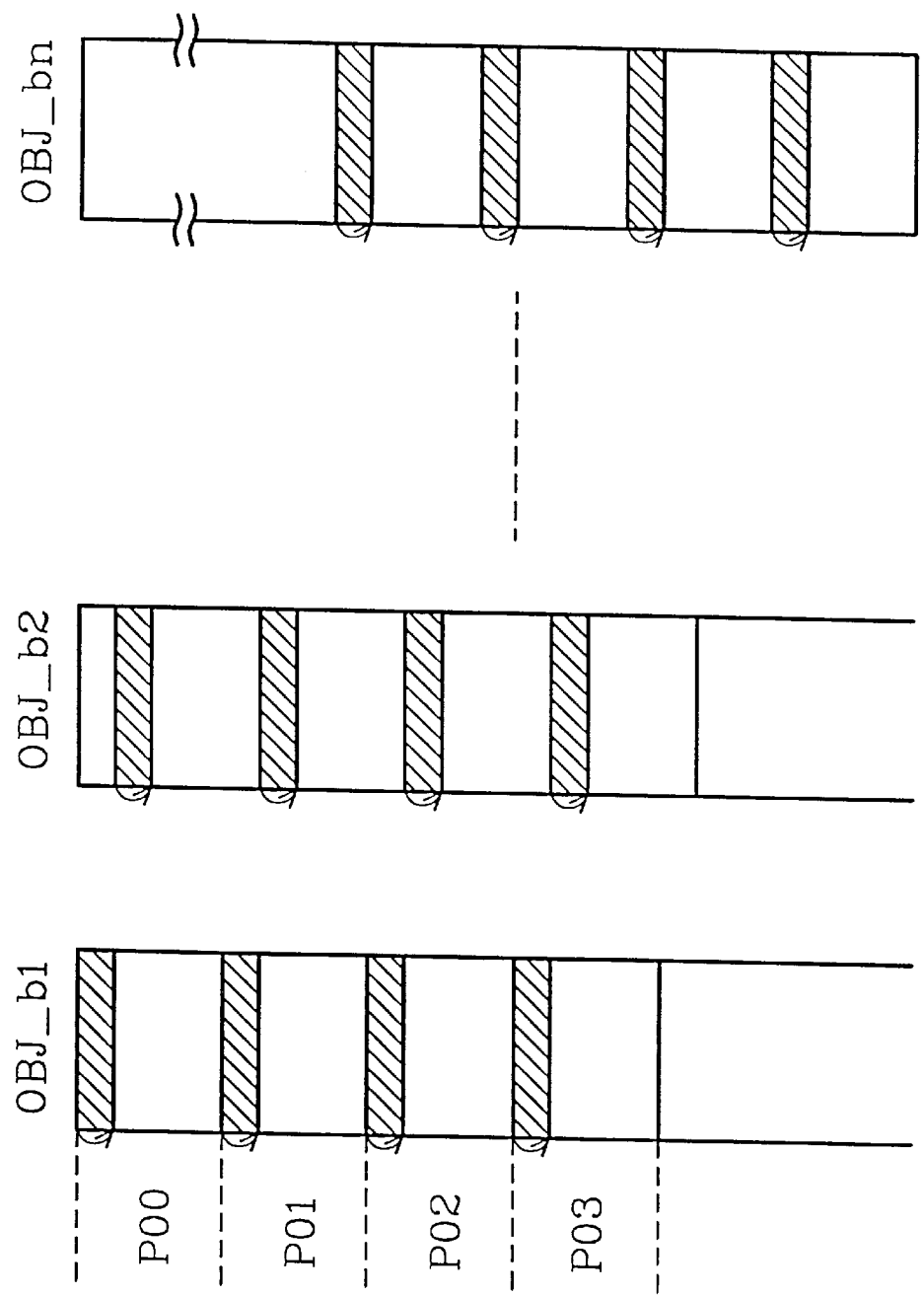
FIG. 19 shows a schematic diagram of the pre-compiled object code corresponding to bit-line errors in accordance with the fifth embodiment of the invention.

FIG. 19 shows a schematic diagram of the designed pre-compiled object code corresponding to bit-line errors according to the embodiment. As shown in the figure, in the pre-compiled object codes OBJ_b1~OBJ_bn, the discrete skipped-code ranges are disposed on every 32 bytes, wherein P00~P03 respectively indicate serial page addresses with the length of 32 bytes. In each page address range, the skipped-code ranges disposed in the pre-compiled object codes OBJ_b1~OBJ_bn cover all the possible bit line errors by partial overlaps. Thereby, it is easier to locate the pre-compiled object code that matches the physical defect distribution type.

The Sixth Embodiment

In the first embodiment, the generation of the pre-compiled object codes OBJ_b1~OBJ_bn refers to the predetermined skipped-code-address range #i, and then the un-compiled source code (refer to FIG. 6) is modified or the standard object code is modified(refer to FIG. 7) so as to generate the pre-compiled object code matching the skipped-code-address range #i. Another feasible method of generating the pre-compiled object codes is to generate a number of object codes with various skipped-code-address ranges, and then to recognize the skipped-code-address range associated with each generated object code.

Figure 20:
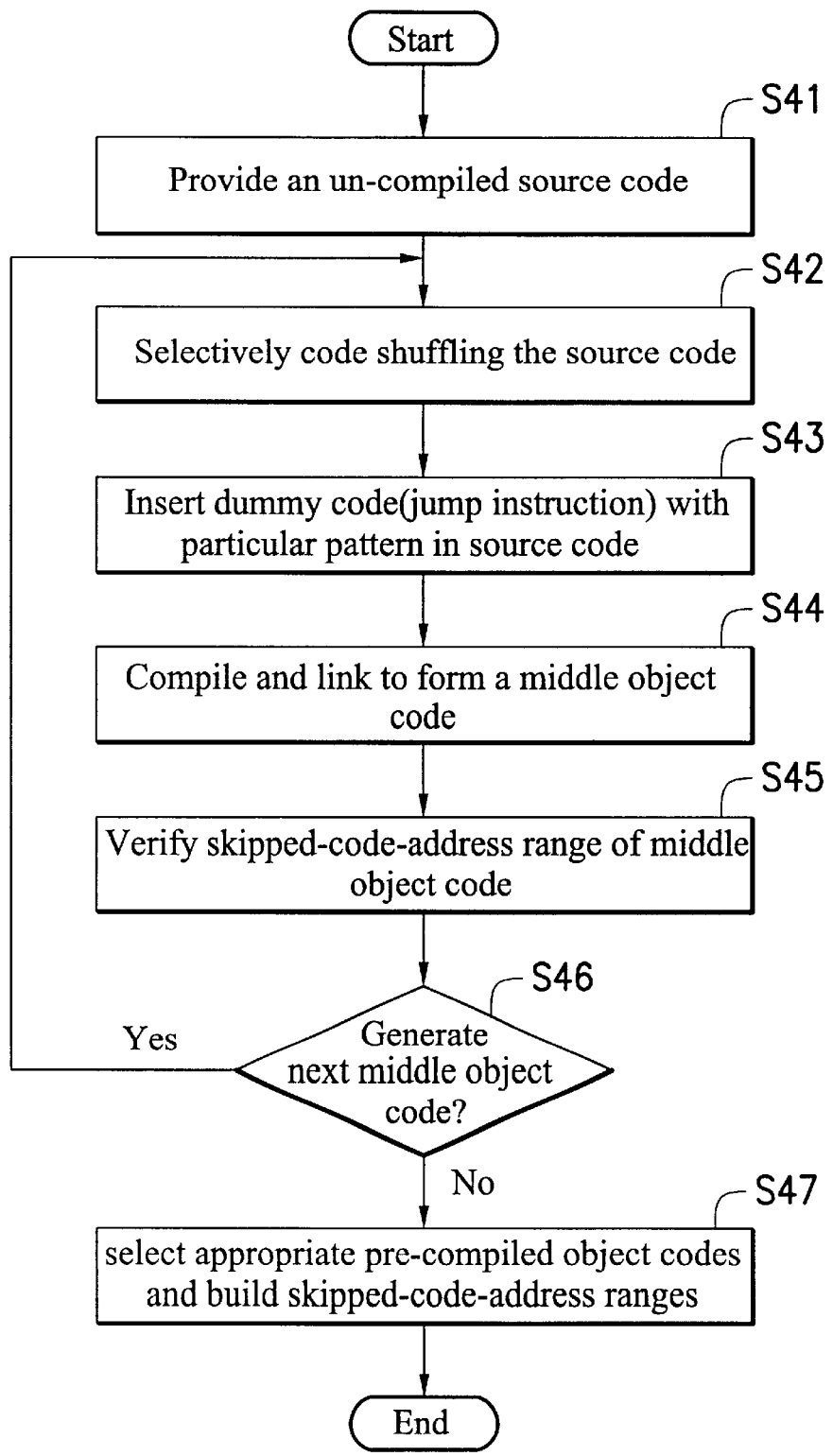
FIG. 20 shows a flowchart of a method of generating a pre-compiled object code in accordance with the sixth embodiment of the invention.

FIG. 20 shows a flowchart of a method for generating a pre-compiled object code according to the sixth embodiment. First, in the step S41, provide an un-compiled source code. Then, in the step S42, selectively shuffle the source code so that the object code generated from the source code can be adjusted dynamically. Then, in the step S43 the dummy code with the particular pattern is inserted in the source code, and the machine code that is subsequently compiled from the inserted dummy code with the particular pattern exhibits a distinguishable pattern; that is, the addresses of the machine code compiled from the dummy code can be recognized in the object code. For example, inserting the array (such as repeat 0009) with a specified initial value between two instruction lines or insert specified instruction lines between two instruction lines. In the case of inserting dummy code between lines of data codes, since the subsequent compiler can automatically connect the divided program code, therefore the jump instruction (JMP) is not necessary to be added; in the situation of inserting instruction lines, it is necessary to add the jump instruction to the beginning of the inserted instruction lines to connect the divided program code.

Then, step S44 compiles and links the source code with dummy code inserted, and the corresponding middle object code is generated. Since the dummy code is also being compiled, therefore in the step S45, the skipped-code-address range of the middle object code, i.e. the dummy code address range corresponding to the machine code, can be verified. Then, in step S46, it is judged whether to generate the next middle object code; if so, the process from step S42 to step S45 is repeated to generate a new middle object code. Finally, a number of middle object codes and the associated skipped-code-address ranges are obtained. According to these identified skipped-code-address ranges, in step S47, an appropriate pre-compiled object code is selected from said middle object codes and included in the skipped-code-address range table thereof, similar to the situation shown in FIG. 5 of the first embodiment.

To sum up, a method of code processing for a partially defective memory according to the present invention comprises at least the following advantages:

1. By using the method, as long as an appropriate code-loading system is combined, defective memory, to a certain degree, can be loaded with an appropriate object code for executing a task normally. Especially for some large-sized integrated circuits. In the past the whole IC usually had to be scrapped because of some defect on the chip memory or not enough redundancy circuitry built in, while the problem can be solved by the invention. In other words, the yield of memory IC production can be improved and, thereby the cost is greatly reduced.

2. Storage media stores pre-compiled object codes corresponding to various defective distribution types in the present invention. Current storage media of large capacity is inexpensive, and can fully support the applications of the present invention for storing a large number of pre-compiled object codes.

3. Further, the invention enumerates several methods of generating pre-compiled object codes, which are not intended to be construed in a limiting sense, and the generating method of the most appropriate pre-compiled object code is selected according to varied circumstances. However, it is understood that for a source code, all the pre-compiled object codes that are needed only have to be compiled and linked once and then can be selected for loading a suitable code into partially defective memory Ics.

4. The invention is also applicable to the memory of an IC, which has more defective memory cells than that can be repaired by redundancy circuitry.

While the invention has been described with references to various illustrative embodiments, the description is not intended to be construed in a limiting sense. Various modifications of the illustrative embodiments, as well as other embodiments of the invention, will be apparent to those persons skilled in the art upon reference to this description. It is therefore contemplated that the appended claims will cover any such modifications or embodiments as may fall within the scope of the invention defined by the following claims and their equivalents.

What is claimed is:

1. A method of processing memory, for loading an executable object code into said memory, comprising the steps of:

setting a plurality of pre-generated object codes each having at least a skipped-code-address range;

detecting defective addresses of said memory;
according to the detecting result, selecting an executable object code, which has the matching skipped-code-address range, from said pre-generated object codes; and
loading said executable object code into said memory for execution.

2. The processing method as claimed in claim 1, wherein said detecting step includes testing the defective addresses of said memory.

3. The processing method as claimed in claim 2, further comprising the step of:
writing said defective addresses from testing into a label memory in said memory.

4. The processing method as claimed in claim 1, wherein said memory includes a label memory, which stores information related to the defective memory of said memory, and said detecting method includes reading said defective addresses from said label memory.

5. The processing method as claimed in claim 4, wherein the information related to the defective memory includes the information related to the addresses of said defective memory.

6. The processing method as claimed in claim 4, wherein the information related to the defective memory includes information related to distribution types of said defective memory.

7. The processing method as claimed in claim 1, further comprising the steps of:
judging a defect distribution type corresponding to said detected defective addresses;
writing said defect distribution type into a label memory of said memory; and
reading said defect distribution type from said label memory.

8. The processing method as claimed in claim 1, further comprising the steps of:
setting a standard object code that corresponds to a source code; and
loading said standard object code into said memory, when said memory doesn't include a defective address.

9. The processing method as claimed in claim 1, further comprising the step of:
setting a skipped-code-address table for showing said pre-compiled object codes and the corresponding skipped-code-address ranges;
wherein the selecting step of said executable object code is determined according to said skipped-code-address table.

10. The processing method as claimed in claim 1, wherein said pre-compiled object code has an overlapping block between the skipped-code-address ranges next to each other.

11. The processing method as claimed in claim 10, wherein the range of said overlapping block is at least half the length of the skipped-code-address range.

12. The processing method as claimed in claim 1, wherein the skipped-code-address range of said pre-compiled object code is set according to the address range that corresponds to memory cells on a word line of the memory.

13. The processing method as claimed in claim 1, wherein the skipped-code-address range of said pre-compiled object code is set according to the address range that corresponds to memory cells on a bit line of the memory.

14. The processing method as claimed in claim 1, wherein the step of generating said pre-generated object codes comprises the steps of:

modifying a source code according to said skipped-code-address range; and
compiling said modified source code to generate said pre-compiled object codes.

15. The processing method as claimed in claim 1, wherein the step of generating said pre-generated object codes comprises the steps of:
generating a standard object code; and
modifying said standard object code according to said skipped-code-address range, to generate said pre-compiled object codes.

16. The processing method as claimed in claim 15, wherein said standard object code is generated from compiling a source code.

17. The processing method as claimed in claim 15, wherein the step of modifying said standard object code comprises the steps of:
determining a first break point and a second break point of said standard object code according to said skipped-code-address range;
moving the code block between the first break point and the second break point to the location between a first address and a second address;
connecting said moved code block to the unmoved part of said standard object code in execution sequence; and
modifying the reference addresses between said moved code block and the unmoved part of said standard object code.

18. The processing method as claimed in claim 17 further comprising the step of:
scanning the source code to determine a plurality of break points of the standard object code.

19. The processing method as claimed in claim 15, wherein said standard object code includes at least a data segment.

20. The processing method as claimed in claim 19, further generating a plurality of standard object codes, wherein said data segments are allocated at different addresses, and in the step of modifying said standard object code the standard object code is modified if said skipped-code-address range is not in said data segments.

21. The processing method as claimed in claim 19, further comprising a step of: dividing said data segments when said skipped-code-address range is allocated at the data segments of said standard object code.

22. The processing method as claimed in claim 21, wherein in the step of dividing said data segments is expanded to be expanded data segments so as to include said skipped-code-address range, and a judging instruction is added to each instruction that accesses said data segments so as to determine the physical location of said expanded data segments.

23. The processing method as claimed in claim 1, wherein the step of generating said pre-generated object codes comprises the steps of:
providing a source code;
inserting at least a skip code into said source code respectively;
compiling the source code that the skip codes have been inserted into so as to generate a plurality of middle object codes;
identifying the skipped-code-address ranges of said middle object codes respectively; and
selecting a plurality of pre-generated object codes from said middle object codes according to the skipped-code-address ranges of said middle object codes.

24. The processing method as claimed in claim 23, wherein said skip codes comprise dummy codes.

25. The processing method as claimed in claim 23, wherein said skip codes comprise identifiable dummy codes, and said processing method identifies the skipped-code-address ranges of said middle object codes respectively.

26. The processing method as claimed in claim 23, further comprising the step of:
code shuffling said source code so as to generate at least one of said middle object codes.

27. The processing method as claimed in claim 23, wherein in the step of inserting identifiable dummy codes jump instructions are also inserted so as to connect the sequence of the inserted program code in said source code.

28. The processing method as claimed in claim 23, further comprising a step of:
generating a skipped-code-address range according to the selected plurality of pre-generated object codes.

29. The processing method as claimed in claim 1, further comprising a step of:
generating another executable object code according to said defective addresses when the skipped-code-address ranges of said pre-generated object codes don't match said defective address.

30. The processing method as claimed in claim 29, wherein the step of generating another executable object code comprises the steps of:
modifying a source code according to said defective address; and
compiling said modified source code to generate said executable object code.

31. The processing method as claimed in claim 29, wherein the step of generating another executable object code comprises the steps of:
compiling a source code to generate a standard object code; and
modifying said standard object code to generate said executable object code according to said defective addresses.

32. The processing method as claimed in claim 1 further comprising the step of:
modifying a dynamic pre-generated object code to generate said executable object code according to said defective addresses when the skipped-code-address ranges of said pre-generated object codes don't match said defective addresses, wherein said dynamic pre-generated object code has a plurality of skipped-code segments.

33. The processing method as claimed in claim 32, wherein said dynamic pre-generated object code includes the information related to at least a breakable address.

34. A system of processing a memory, for loading an executable object code generated from a source code into said memory, comprising:
a storage device, for storing a plurality of pre-generated object codes that correspond to said source code, each pre-generated object code having at least a skipped-code-address range;
a processing unit, according to defective addresses of said memory, for selecting an executable object code, which has the matching skipped-code-address range, from said pre-generated object codes; and
an interface circuit, for loading said executable object code into said memory for execution.

35. The processing system as claimed in claim 34, whereinat least one of said pre-generated object codes is generated by compilation.

36. The processing system as claimed in claim 34, wherein said storage device further stores a skipped-code-address table for indicating said pre-generated object codes and the corresponding skipped-code-address ranges, and said processing unit determines said executable object code in said pre-generated object codes according to said skipped-code-address table.

37. The processing system as claimed in claim 36, wherein said storage device further stores the standard object code that corresponds to said source code; when said memory doesn't include a defective address, said processing unit loads said standard object code into said memory.

38. The processing system as claimed in claim 34, further comprising a tester for testing said memory.

39. The processing system as claimed in claim 38, wherein said memory includes a label memory, said tester records said defective addresses in said label memory, and said processing unit reads said defective addresses from said label memory.

40. A system of processing a memory, for loading an executable object code, comprising:
a memory, disposed on an integrated circuit;
a storage device, for storing a plurality of pre-generated object codes that correspond to said source code, each pre-generated object code having at least a skipped-code-address range;
a processing unit, disposed on said integrated circuit, for testing defective addresses of said memory, and for selecting an executable object code, which has the matching skipped-code-address range, from said pre-generated object codes to load into said memory.

41. The processing system as claimed in claim 40, wherein at least one of said pre-generated object codes is generated by compilation.

42. The processing system as claimed in claim 40, wherein said storage device further stores a skipped-code-address table for indicating said pre-generated object codes and the corresponding skipped-code-address ranges, and said processing unit determines said executable object code in said pre-generated object codes according to said skipped-code-address table.

43. The processing system as claimed in claim 40, wherein said storage device further stores the standard object code that corresponds to said source code, and when said memory doesn't include a defective address, said processing unit loads said standard object code into said memory.

* * * * *